(12) United States Patent  
Kobayakawa

(10) Patent No.: US 8,155,668 B2  
(45) Date of Patent: Apr. 10, 2012

(54) RADIO COMMUNICATION APPARATUS, POSITION MEASUREMENT METHOD FOR RADIO COMMUNICATION APPARATUS, AND RADIO COMMUNICATION SYSTEM

(75) Inventor: Shuji Kobayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/004,549

(22) Filed: Jan. 11, 2011

(65) Prior Publication Data

US 2011/0183690 A1   Jul. 28, 2011

(30) Foreign Application Priority Data

Jan. 28, 2010   (JP) ................ 2010-017235

(51) Int. Cl.  
*H04M 1/00* (2006.01)  
*H04W 72/00* (2009.01)  
*G01S 5/04* (2006.01)

(52) U.S. Cl. ............ 455/456.1; 455/454; 455/506; 342/442; 342/453

(58) Field of Classification Search ............ 455/454, 455/14, 15, 506, 404.2, 456.5, 65; 342/442, 342/146, 453, 118

See application file for complete search history.

(56) References Cited

U.S. PATENT DOCUMENTS

| | | | |
|---|---|---|---|
| 5,534,876 A | 7/1996 | Erickson et al. | |
| 6,487,417 B1 * | 11/2002 | Rossoni et al. | 455/67.16 |
| 6,577,273 B2 | 6/2003 | Hamada et al. | |
| 6,864,839 B2 | 3/2005 | Hamada et al. | |
| 7,026,991 B2 | 4/2006 | Hamada et al. | |
| 7,391,371 B2 | 6/2008 | Hamada et al. | |
| 7,519,136 B2 | 4/2009 | Qi et al. | |
| 2002/0196188 A1 | 12/2002 | Holt | |
| 2004/0169602 A1 | 9/2004 | Hamada et al. | |
| 2005/0270227 A1 | 12/2005 | Stephens | |
| 2006/0082502 A1 | 4/2006 | Dooley | |

FOREIGN PATENT DOCUMENTS

| | | |
|---|---|---|
| JP | 2001-237755 | 8/2001 |
| JP | 2006-023267 | 1/2006 |
| JP | 2006-170698 | 6/2006 |
| JP | 2007-155523 | 6/2007 |

OTHER PUBLICATIONS

Extended European Search Report mailed Jun. 1, 2011 for corresponding European Application No. 11151700.9.

Kietlinski-Zaleski et al., "TOA UWB Position Estimation with Two Receivers and a Set of Known Reflectors," ICUWB, Sep. 9-11, 2009, pp. 376-380.

* cited by examiner

*Primary Examiner* — Kiet Doan  
(74) *Attorney, Agent, or Firm* — Fujitsu Patent Center

(57) ABSTRACT

A radio communication apparatus for performing radio communication with a terminal apparatus, including: a calculation unit which calculates first and second propagation distances indicating path lengths of first and second paths respectively; a decision unit which determines whether the first and second received waves are reflected waves or direct waves, respectively, based on the first and second propagation distances, and outputs a first or second terminal-reflection point distance on determining the first or second received wave as the reflected wave, or outputs the first or second propagation distance on determining the first or second received wave as the direct wave; and a position measurement unit which measures the position of the terminal apparatus based on the first or second terminal-reflection point distance, or the first or second propagation distance.

12 Claims, 18 Drawing Sheets

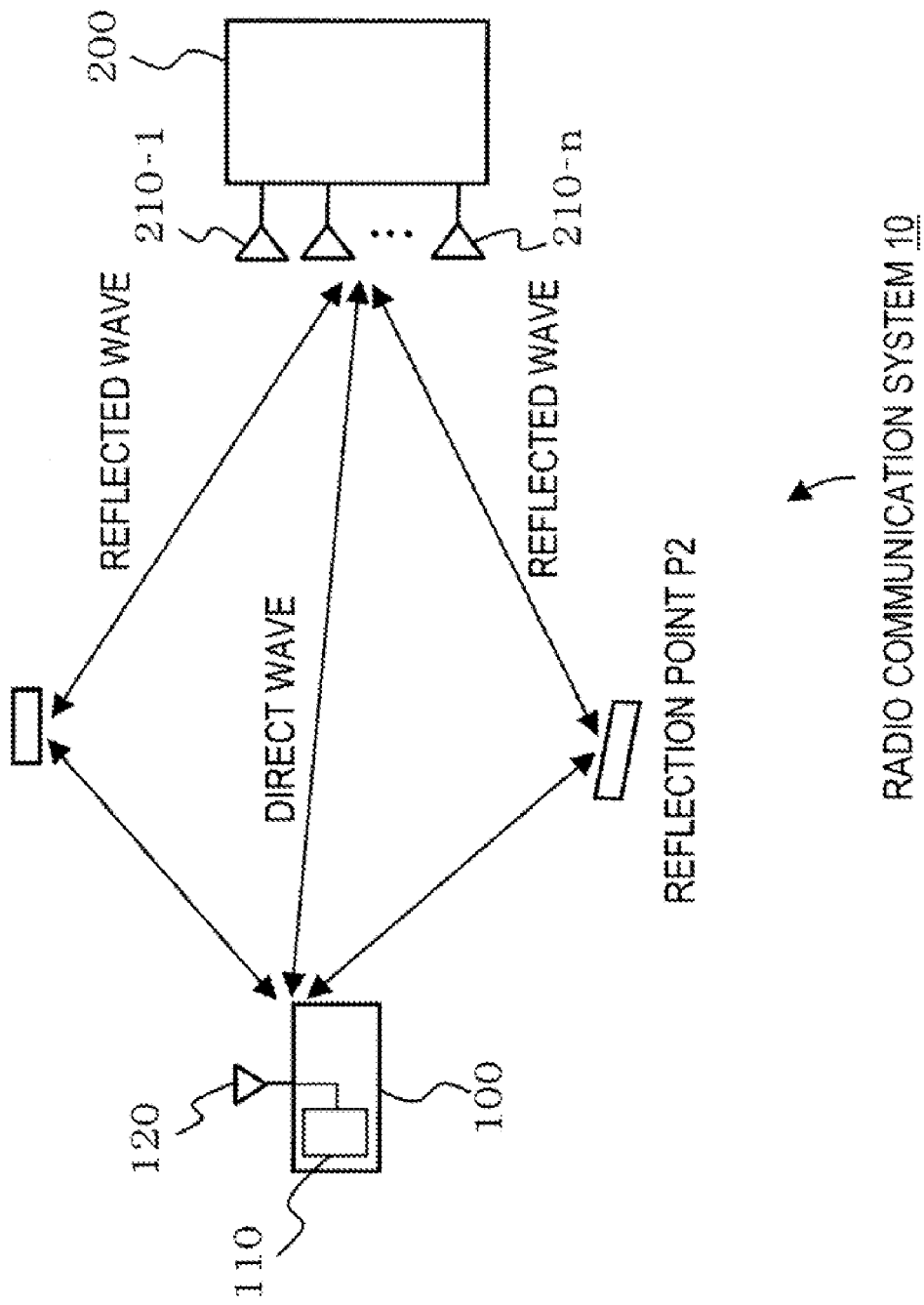

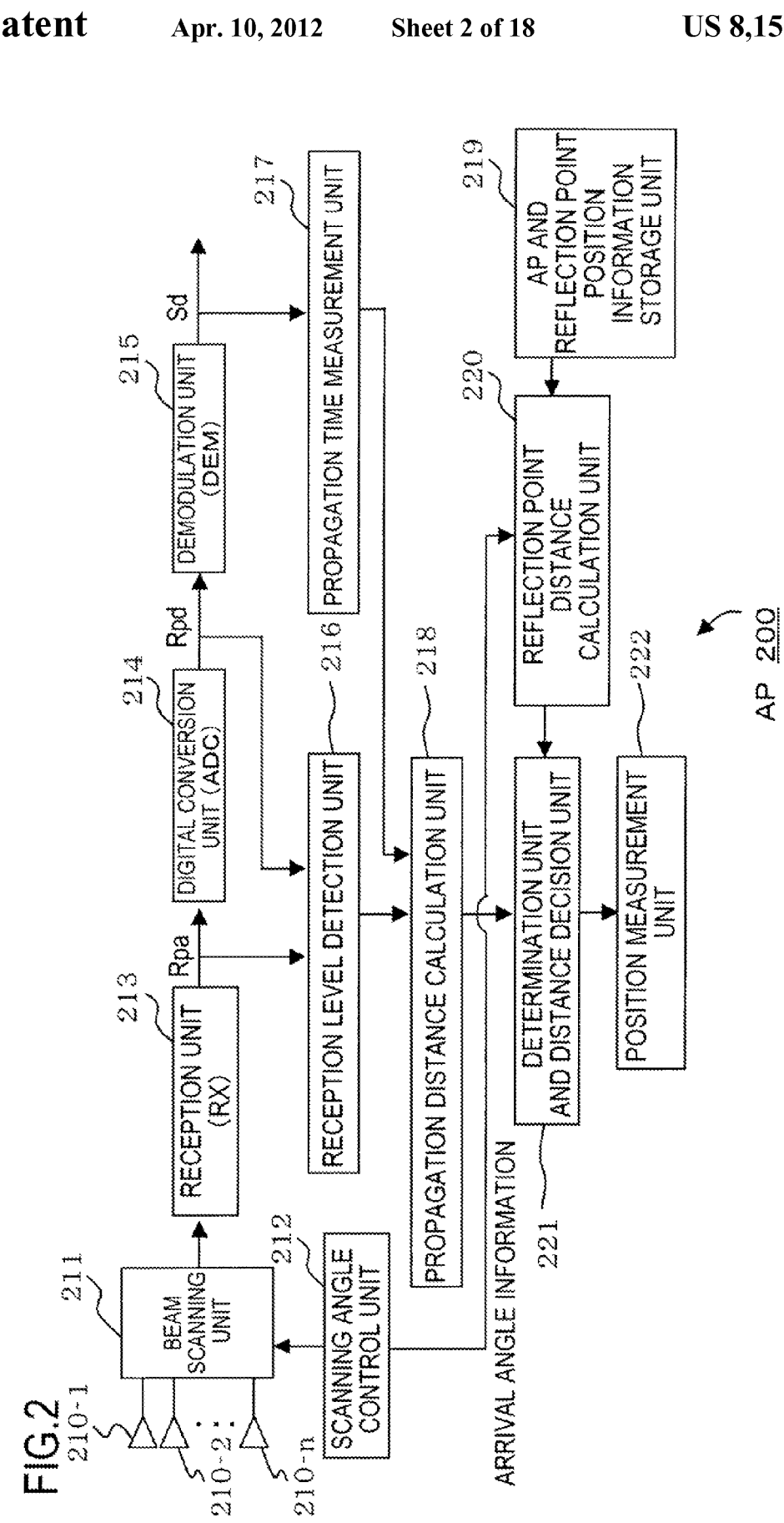

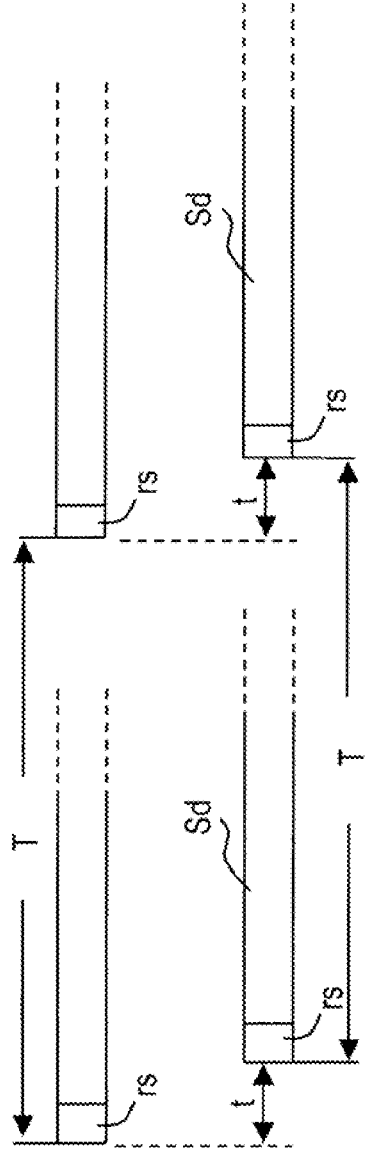
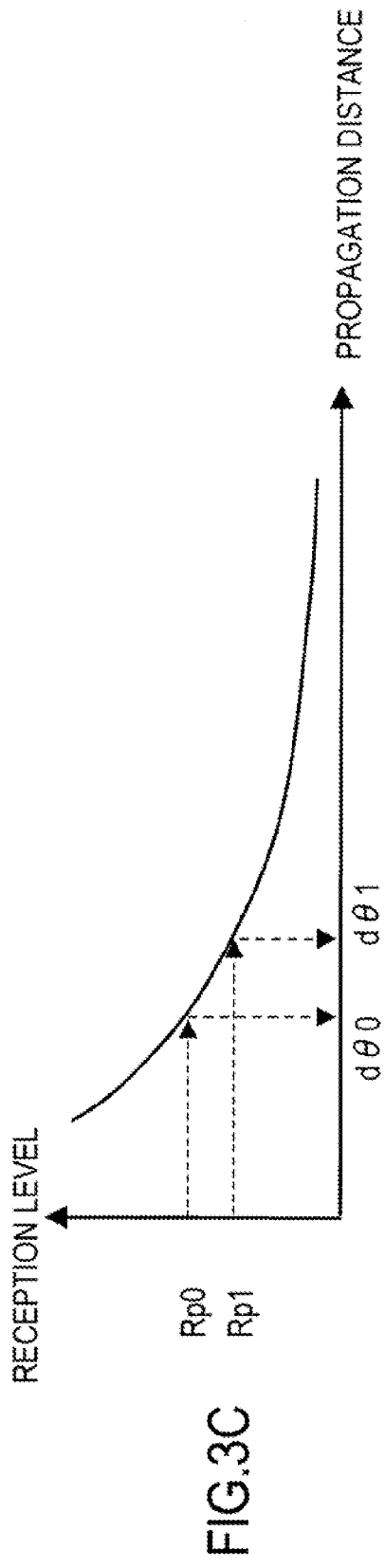
FIG.3A
FIG.3B
FIG.3C

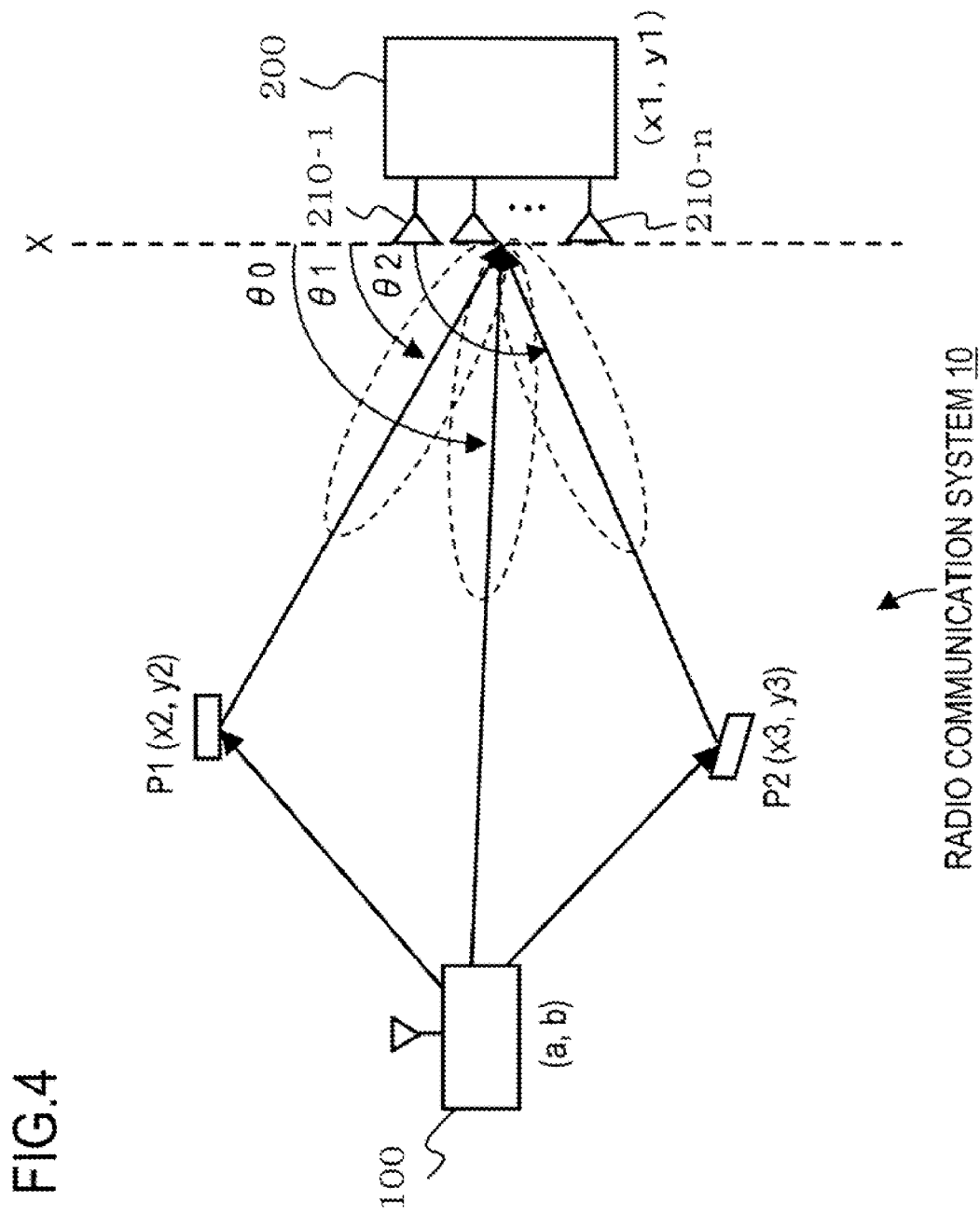

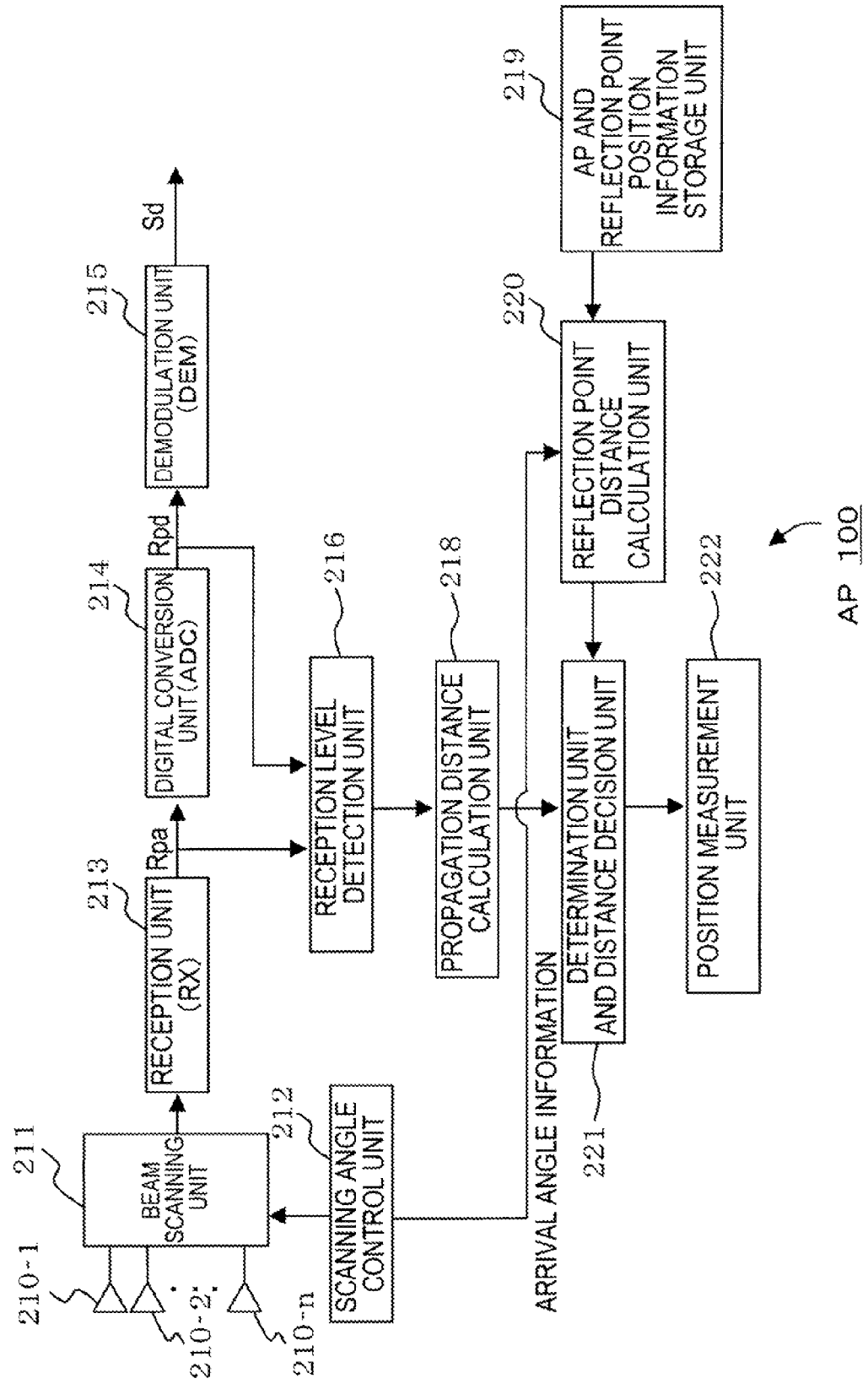

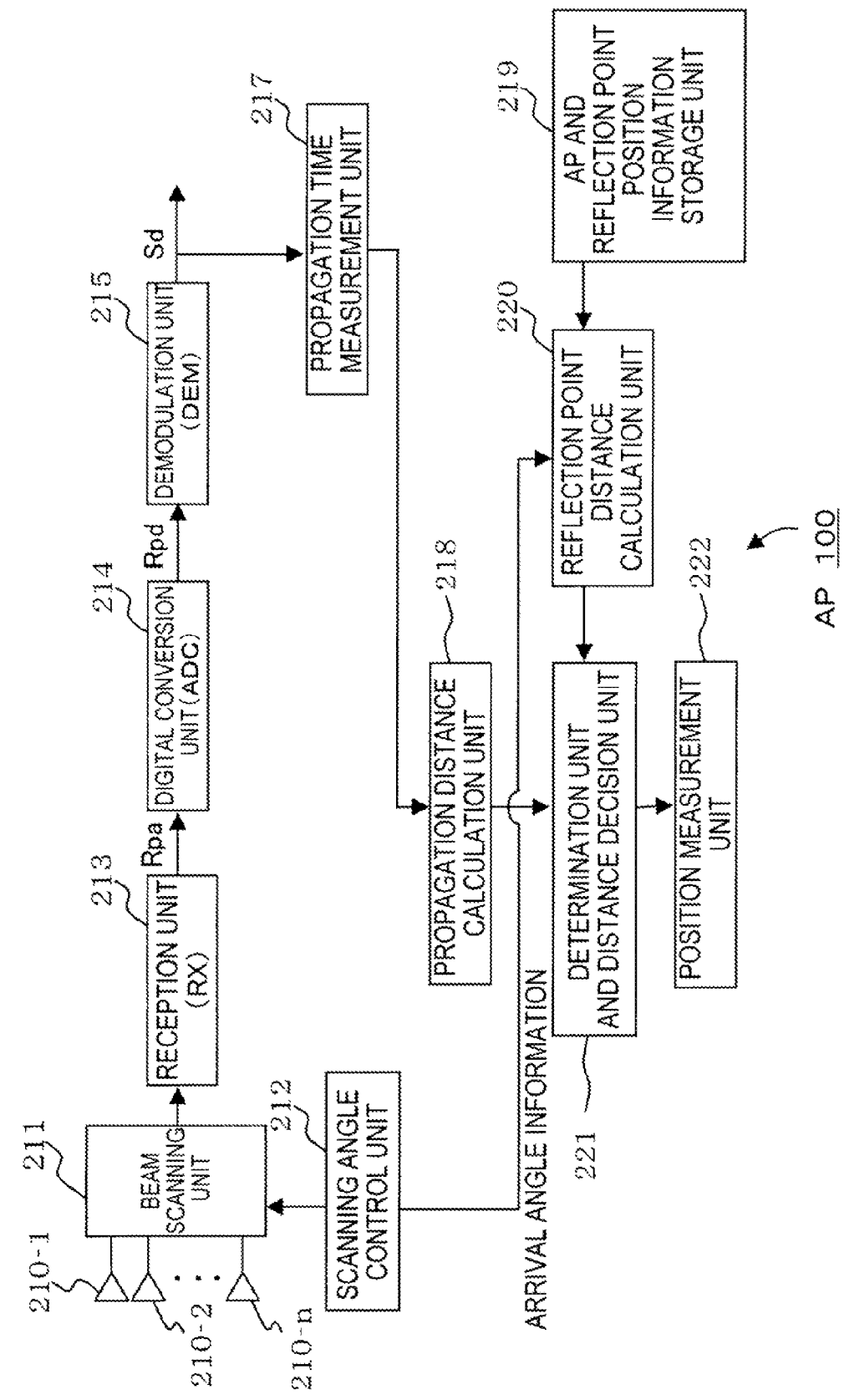

RADIO COMMUNICATION APPARATUS, POSITION MEASUREMENT METHOD FOR RADIO COMMUNICATION APPARATUS, AND RADIO COMMUNICATION SYSTEM

CROSS-REFERENCE TO RELATED APPLICATION

This application is based upon and claims the benefit of priority of the prior Japanese Patent Application No. 2010-17235, filed on Jan. 28, 2010, the entire contents of which are incorporated herein by reference.

FIELD

The embodiments discussed herein are related to a radio communication apparatus, a position measurement method for a radio communication apparatus, and a radio communication system.

BACKGROUND

In a conventional radio communication system for performing radio communication between a base station and a terminal, the base station can perform radio communication with facing the antenna toward the terminal by measuring a position of the terminal.

In such a position measurement, it is know that a base station transmits first and second signals from two or more antennas, and a mobile station determines a phase difference between the received first and second signals, calculates a direction of the mobile station viewed from the base station based on the phase difference, and transmits the data to the base station.

A radio station direction estimation apparatus, which estimates an arrival direction of a radio wave and estimates a position of the radio station by a ray trace method based on the estimated radio wave arrival direction and three-dimensional map data, is also known.

It is also known that a base station determines whether observed signal transmitted from a node is direct wave or reflected wave based on identification information of the observed signal and the interval of the observed signal, and corrects the distance between the node and the base station based on the determined result.

Patent Document 1: Japanese Laid-open Patent Publication No. 2001-237755
Patent Document 2: Japanese Laid-open Patent Publication No. 2006-170698
Patent Document 3: Japanese Laid-open Patent Publication No. 2007-155523

However in a multi-path environment where direct wave and reflected wave coexist, the base station, in some cases, may receive both direct wave and reflected wave. In the above mentioned prior art, which determines a phase difference between two signals, or which estimates the arrival direction of radio wave, the multi-path environment is not considered, therefore the position of the terminal cannot be measured at high precision.

In the case of the above mentioned prior art, which determines whether the receive wave is the direct wave or reflected wave, the distance of the base station and the node is determined based on the result of determining whether the received wave is the direct wave or reflected wave, and determining the position of the node is not considered. Therefore in this prior art as well, the position of the terminal cannot be measured at high precision.

SUMMARY

According to an aspect of the invention, a radio communication apparatus for performing radio communication with a terminal apparatus, the radio communication apparatus including: a calculation unit which calculates first and second propagation distances indicating path lengths of the first and second paths respectively, when radio signals transmitted from the terminal apparatus at least via first and second paths are received as first and second received waves respectively; a decision unit which determines whether the first and second received waves are reflected waves reflected at first and second reflection points or direct waves without via the first and second reflection points, respectively, based on the first and second propagation distances, and outputs a first or second terminal-reflection point distance indicating a distance between the terminal apparatus and the first or second reflection points which is the closest to the terminal apparatus on the first or second path, respectively, on determining the first or second received wave as the reflected wave, or outputs the first or second propagation distance on determining the first or second received wave as the direct wave; and a position measurement unit which measures the position of the terminal apparatus based on the first or second terminal-reflection point distance, or the first or second propagation distance, output from the decision unit respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration example of a radio communication system;

FIG. 2 illustrates a configuration example of AP;

FIG. 3A and FIG. 3B illustrate an example of a synchronization signal respectively, and FIG. 3C illustrates a graph depicting an example of the relationship between the reception level and the propagation distance;

FIG. 4 illustrates an example of a propagation path of a received wave;

FIG. 17 illustrates another configuration example of AP 200; and

FIG. 18 illustrates another configuration example of AP 200.

DESCRIPTION OF EMBODIMENTS

Figure 5:
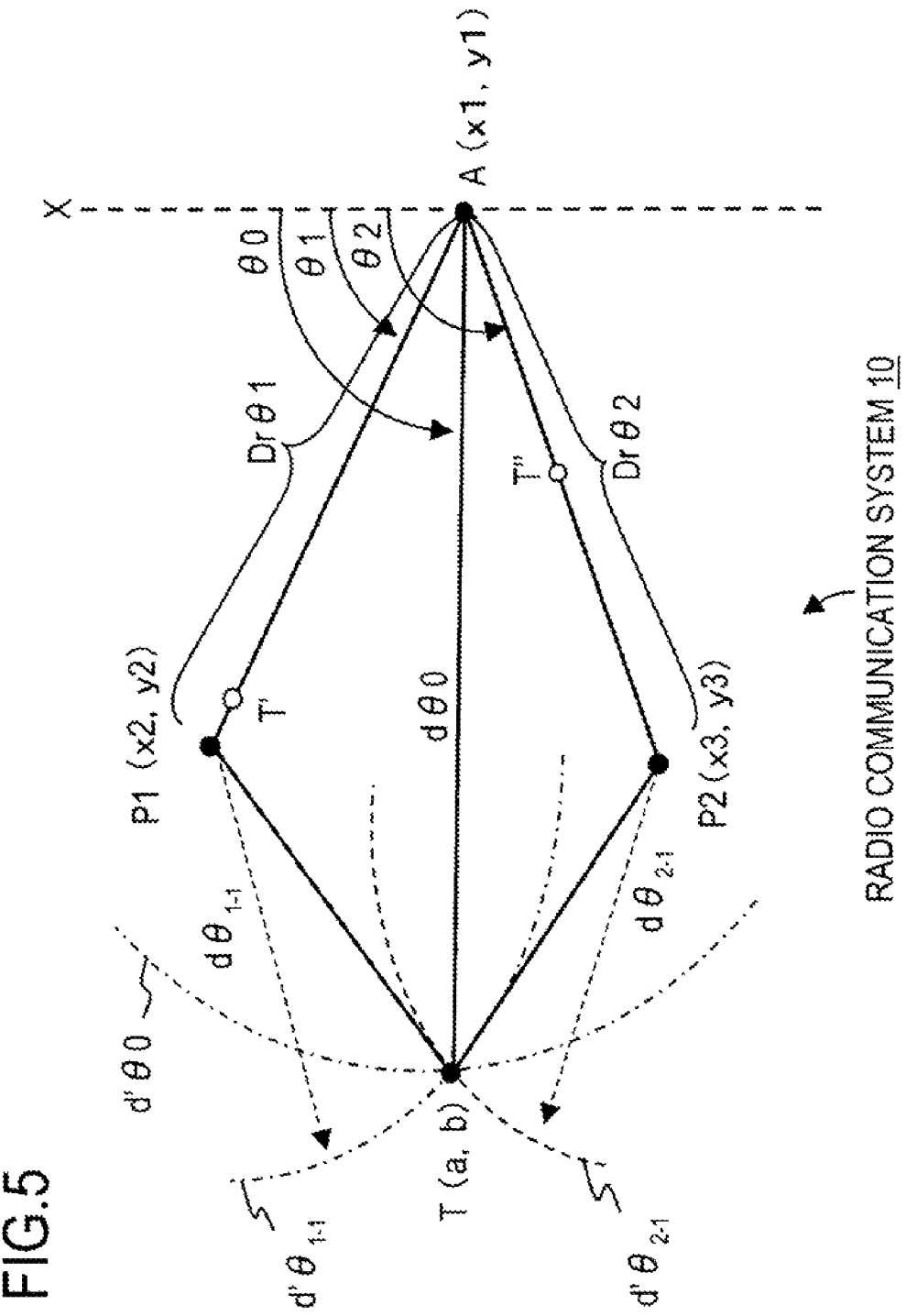
FIG. 5 illustrates an example of a propagation path of a received wave.

Embodiments of the present invention will now be described.

Configuration Example

FIG. 1 illustrates a configuration example of a radio communication system 10. The radio communication system 10 includes a terminal apparatus (hereafter "terminal") 100 and radio communication apparatus (or access point, hereafter "AP") 200. In the radio communication system 10, two reflection points, P1 and P2, are disposed.

The terminal 100 and the AP 200 can perform radio communication by transmitting and receiving radio signal. The terminal 100 can move and perform radio communication with the AP 200 within the radio wave reachable range of the AP 200. The terminal 100 includes a transmission and reception unit 110 and antenna 120.

The transmission and reception unit 110 modulates data by a predetermined modulation system, and outputs the data to the antenna 120 as radio signal, or demodulates radio signal received by the antenna 120 from the AP 200 by a predetermined demodulation system so as to extract data.

The antenna 120 transmits the radio signal output from the transmission and reception unit 110 to the AP 200, or receives the radio signal transmitted from the AP 200, and outputs to the transmission and reception unit 110. The antenna 120 may be a plurality of antennas. And the terminal 100 may be a plurality of terminals.

The AP 200 includes a plurality of array antennas 210-1 to 210-n (n is 2 or greater integer). Each array antenna 210-1 to 210-n can transmit the radio signal to the terminal 100 with changing the beam angle, and receive the radio signal transmitted from the terminal 100.

The AP 200 and the terminal 100 can receive the radio signal from a plurality of paths. In the case of the example in FIG. 1, the AP 200 can directly receive the radio signal transmitted from the terminal 100 without going through the reflection points P1 and P2. The AP 200 can also receive the radio signal via path going through the reflection points P1 and P2. The AP 200 in this way can receive the radio signal transmitted from the terminal 100 as received wave via the paths of direct wave and reflected wave. This is the same for the terminal 100.

The reflection points P1 and P2 are, for example, fixed points of obstacles which reflect radio wave, such as a wall and partition, in the case of this radio communication system 10 being used in a hospital. Therefore according to the embodiment, it is assumed that the positional coordinates of the reflection points P1 and P2 are predetermined and stored in the AP 200. In the example in FIG. 1, the two reflection points P1 and P2 are illustrated as an example, but the number of reflection points may also be one or three or more.

FIG. 2 illustrates a configuration example of the AP 200. The AP 200 includes a plurality of array antennas 210-1 to 210-n, beam scanning unit 211, scanning angle control unit 212, reception unit 213, digital conversion unit 214, demodulation unit 215, reception level detection unit 216, propagation time measurement unit 217, propagation distance calculation unit 218, AP and reflection point position information storage unit (hereafter "storage unit") 219, reflection point distance calculation unit 220, determination unit and distance decision unit (hereafter "decision unit") 221, and position measurement unit 222.

The beam scanning unit 211 performs beam scan at a predetermined scanning angle with respect to the plurality of array antennas 210-1 to 210-n based on the control signal from the scanning angle control unit 212. The beam scanning unit 211 also outputs the radio signal received by the plurality of array antennas 210-1 to 210-n to the reception unit 213.

The scanning angle control unit 212 outputs the control signals to the beam scanning unit 211 so that the array antennas 210-1 to 210-n operate at the predetermined scanning angle. The scanning angle control unit 212 also holds information on the current scanning angle (or arrival angle) of the array antennas 210-1 to 210-n, and outputs this information to the reflection point distance calculation unit 220 as arrival angle information.

The reception unit 213 executes such processing as power amplification and down conversion for the radio signal so as to convert it into reception signal Rpa.

The digital conversion unit 214 converts the analog reception signal Rpa into a digital reception signal Rpd.

The demodulation unit 215 demodulates the reception signal Rpd by the predetermined demodulation system (e.g. QPSK, 16QAM), and outputs a demodulation signal Sd.

The reception level detection unit 216 inputs the analog reception signal Rpa and digital reception signal Rpd, and detects a reception level of the radio signal received by the AP 200 (e.g. received power level) using one of the signals Rpa and Rpd.

The propagation time measurement unit 217 measures propagation time until the radio signal transmitted from the terminal 100 reaches the AP 200 using the demodulation signal Sd. The propagation time is measured as follows, for example. FIG. 3A illustrates an example of a transmission signal (e.g. signal before modulation), which is transmitted from the terminal 100, and FIG. 3B illustrates an example of the demodulation signal Sd demodulated by the AP 200. As illustrated in FIG. 3A, the transmission signal includes a synchronization signal rs to be transmitted at a predetermined transmission timing T. The propagation time measurement unit 217 stores the predetermined transmission timing T of the synchronization signal rs in advance, measures the delay time t of the synchronization signal rs included in the demodulation signal Sd with respect to the transmission interval T, and outputs the delay time t as the propagation time.

The propagation distance calculation unit 218 measures the propagation distance dθ based on the reception level output from the reception level detection unit 216, or the propagation time output from the propagation time measurement unit 217. The propagation distance dθ, for example, is a distance on the path of the radio signal transmitted from the terminal 100 (or AP 200) to be received by the AP 200 (or terminal 100). For example, in FIG. 1, the distance on the path of the radio signal transmitted from the terminal 100 to reach the AP 200 via the reflection point P1 is dθ. The distance on the path of the direct wave is also the propagation distance dθ.

To calculate the propagation distance dθ based on the reception level, the propagation distance calculation unit 218 performs calculation as follows, for example. The propagation distance calculation unit 218 holds a table which indicates the relationship of the reception level and the propagation distance dθ, and selects the propagation distance dθ corresponding to the reception level based on this table. FIG. 3C is a graph depicting an example of the relationship between the reception level and the propagation distance dθ. The graph illustrated in FIG. 3C is called an attenuation curve, and when the reception level is Rp0>Rp1, the propagation distance is dθ0≦dθ1. The propagation distance calculation unit 218 holds the table corresponding to this attenuation curve, reads the propagation distance dθ corresponding to the reception level based on the table, and outputs the propagation distance dθ.

On the other hand, to calculate the propagation distance dθ based on the propagation time, the propagation distance calculation unit 218 performs calculation as follows, for example. In other words, the propagation distance calculation unit 218 calculates the propagation distance dθ by computing $$d\theta = t \times c \quad (1)$$

where c is the radio wave speed (or light speed) with respect to the propagation time t and dθ is the propagation distance.

The propagation distance calculation unit 218 can calculate the propagation distance dθ based on either the reception level or the propagation time, so in FIG. 2, one of the reception level detection unit 216 and the propagation time measurement unit 217 may be omitted. A configuration example of the AP 200 in such a case will be described later. The propagation distance calculation unit 218 outputs the calculated propagation distance dθ to the decision unit 221.

The storage unit 219 holds the information on the position of the AP 200 and the position of each reflection point, such as the beam scanning angle and the positional coordinates of the AP 200, for example. The positional coordinates of the AP 200 and each reflection point are stored in the storage unit 219 in advance as a map, drawing and actual measured values, for example.

The reflection point distance calculation unit 220 calculates the distance between the AP 200 and each reflection point (hereafter "reflection point distance") Drθ, and the distance between each reflection point, based on the information on each position information on the AP 200 and the reflection points stored in the storage unit 219, and the arrival angle information from the scanning angle control unit 212. The reflection point distance calculation unit 220 outputs the reflection point distance Drθ and other data to the decision unit 221. Since the storage unit 219 holds positional information on the AP 200 and so on in advance, the reflection point distance calculation unit 220 may calculate the reflection point distance Drθ in advance, before the decision unit 221 and so on starts operation.

The decision unit 221 determines whether the received radio signal is radio signal received as the direct wave or radio signal received as the reflected wave, based on the propagation distance dθ and the reflection point distance Drθ. If the determined result is the reflected wave, the decision unit 221 outputs a distance generated by subtracting the reflection point distance Drθ to the position measurement unit 222, and if the determined result is the direct wave, the decision unit 221 outputs the propagation distance dθ to the position measurement unit 222. The decision unit 221 will be described in detail later.

The position measurement unit 222 measures the position of the terminal 100 based on the distance determined by the decision unit 221. Position measurement will also be described later.

<Example of Position Measurement>

Now position measurement in the AP 200 will be described in detail. First a positional relationship will be described. FIG. 4 illustrates an example of the positional relationship of the reflection points P1, P2, terminal 100 and AP 200 in the radio communication system 10 illustrated in FIG. 1. The example to be described below is an example that the radio signal is transmitted from the terminal 100 to the AP 200.

The positions of the AP 200 and the reflection points P1 and P2 are stored in the AP 200 in advance, and are assumed to be (x1, y1), (x2, y2) and (x3, y3) respectively, for example. The AP 200 measures the positional coordinates (a, b) of the terminal 100.

Here, when the terminal 100 is located in the position coordinates (a, b), the array antennas 210-1 to 210-$n$ of the AP 200 can receive the reflected wave reflected by the reflection point P1 if directed to the direction of the azimuth θ1 with respect to X axis. The array antennas 210-1 to 210-$n$ can also receive the direct wave from the terminal 100 at azimuth θ0. The array antennas 210-1 to 210-$n$ can also receive the reflected wave reflected by the reflection point P2 at azimuth θ2. In this way, the array antennas 210-1 to 210-$n$ of the AP 200, directed at the azimuth of the reflection points P1 and P2 disposed at fixed positions, can receive the reflected waves out of the received waves from the terminal 100.

Figure 6:
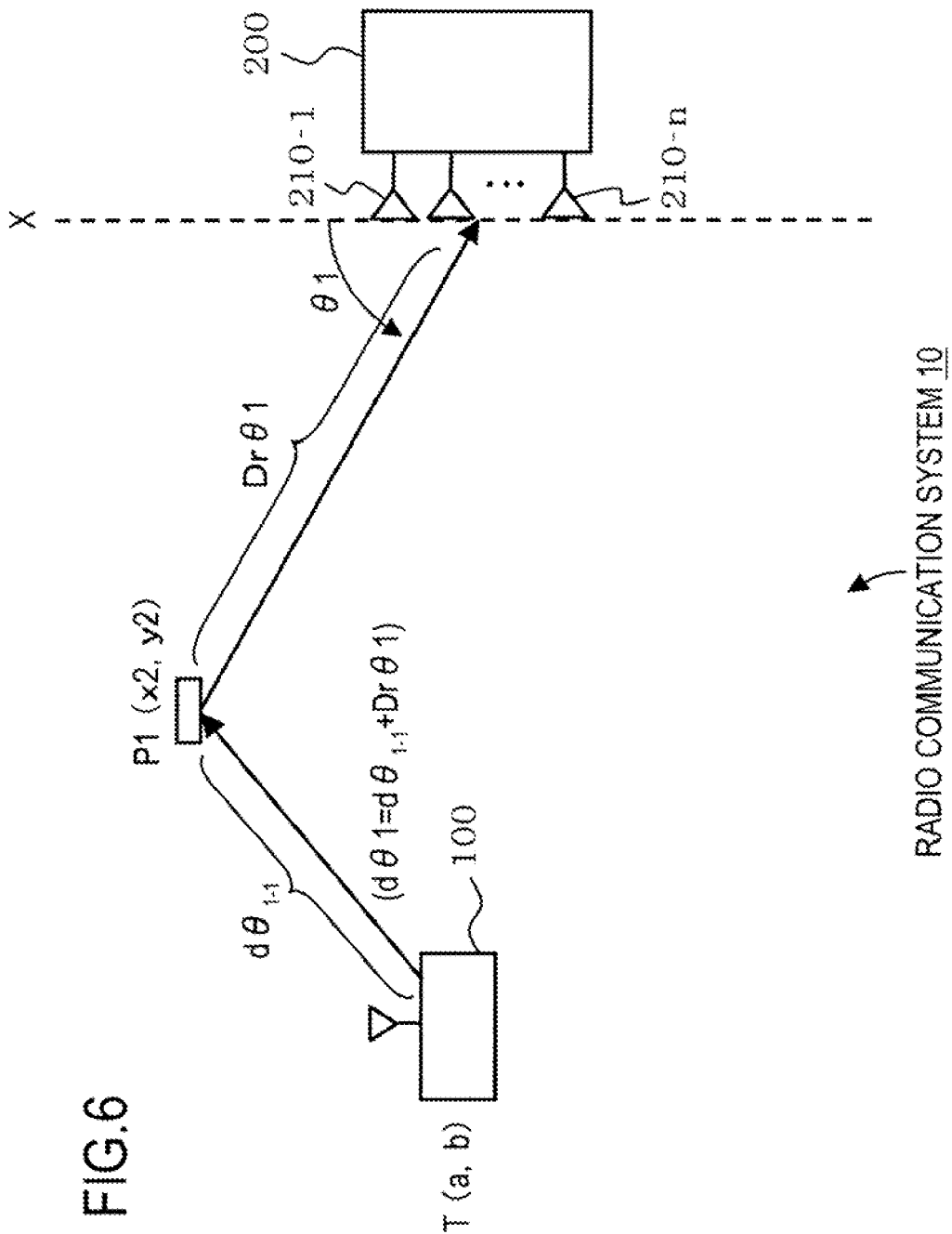
FIG. 6 illustrates an example of a propagation path of a received wave.
Figure 7:
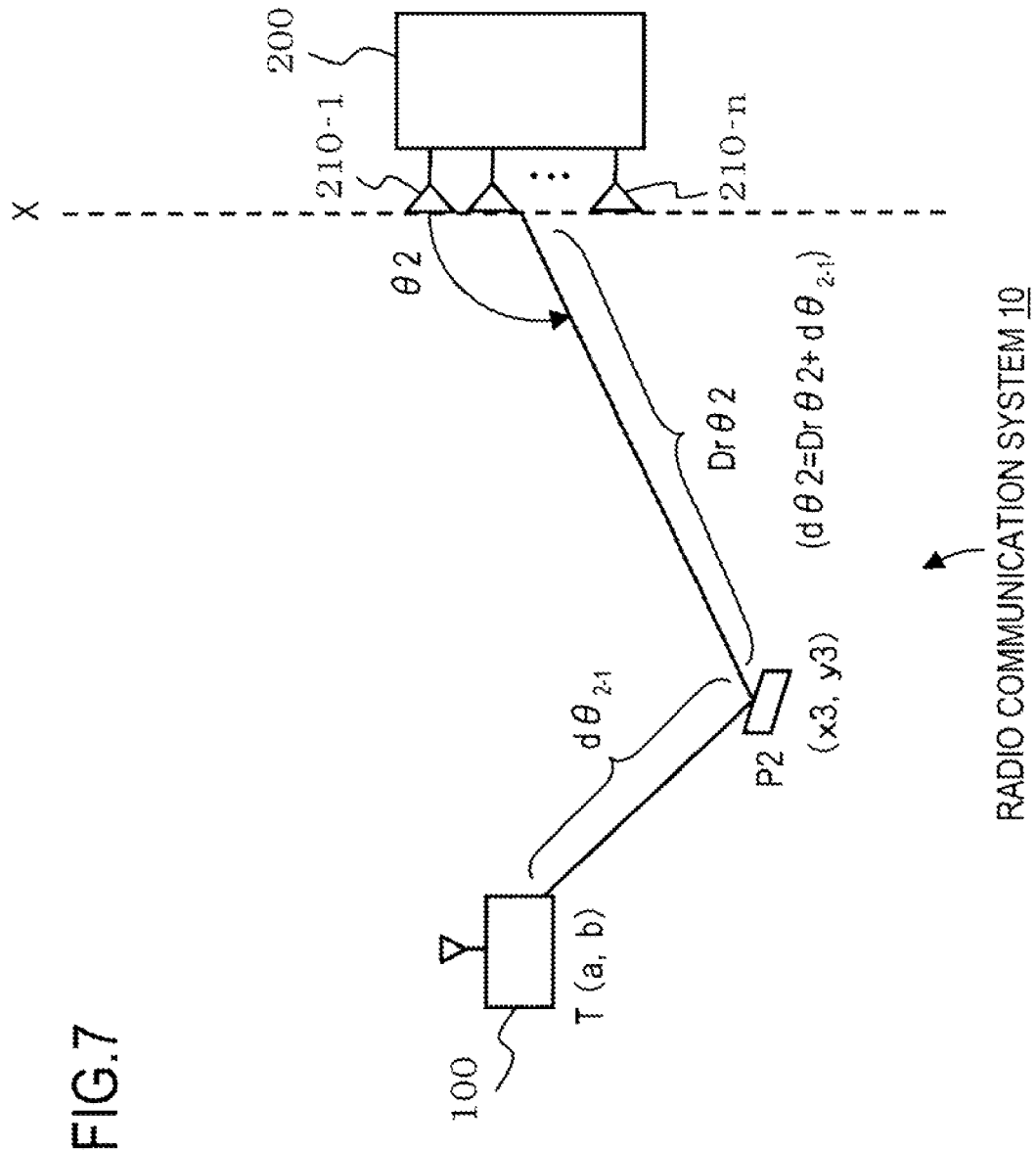
FIG. 7 illustrates an example of a propagation path of a received wave.

Now computing the positional coordinates (a, b) of the terminal 100 will be described. FIG. 5 to FIG. 7 illustrate an example of the relationship between the coordinate position and each distance with respect to the reflection points P1 and P1 illustrated in FIG. 4. In FIG. 5, "A" indicates the positional coordinates (x1, y1) of the AP 200, and "T" indicates the positional coordinates (a, b) of the terminal 100.

As described above, it is assumed that the reflection points P1 and P2 and AP 200 are disposed in predetermined fixed positions. If the distance between the AP 200 and the reflection point P1 is Drθ1, and the distance between the AP 200 and the reflection point P2 is Drθ2, the distances Drθ1 and Drθ2 are fixed values. On the other hand, Position T (a, b) of the terminal 100 changes as the terminal 100 moves. If the terminal 100 is located at the position T (a, b), the propagation distance dθ1 between the terminal 100 and the AP 200 on the path via the reflection point P1, as illustrated in FIG. 6, is obtained by following expression.

$$d\theta 1 = Dr\theta 1 + d\theta_{1-1} \quad (2)$$

Here $d\theta_{1-1}$ is a distance from the reflection point P1 to the position T (a, b) of the terminal 100, for example.

On the path via the reflection point P2, the propagation distance dθ2 between the terminal 100 and the AP 200, as illustrated in FIG. 7, is obtained by following expression.

$$d\theta 2 = Dr\theta 2 + d\theta_{2-1} \quad (3)$$

Here $d\theta_{2-1}$ is a distance from the reflection point P2 to the position (a, b) of the terminal 100, for example.

On the path of the direct wave, the propagation distance between the terminal 100 and the AP 200 is dθ0 as illustrated in FIG. 5.

As mentioned above, the propagation distance calculation unit 218 calculates the propagation distance dθ1 and the reflection point distance calculation unit 220 calculates the fixed value Drθ1 in advance, based on the positional coordinates (x2, y2) of the reflection point P1 and the positional coordinates (a, b) of the AP 200. The decision unit 221 can calculate the distance $d\theta_{1-1}$ between the terminal 100 and the reflection point P1 by substituting the propagation distance dθ1 and the distance Drθ1 for Expression (2).

In the same manner, the propagation distance calculation unit 218 calculates the propagation distance dθ2 with respect to the path via the reflection point P2, the reflection point distance calculation unit 220 calculates the distance Drθ2 in advance, and the decision unit 221 calculates the distance $d\theta_{2-1}$ from the reflection point P2 to the terminal 100 by substituting the calculated propagation distance dθ2 and the distance Drθ2 for expression (3).

The position measurement unit 222 computes the position T (a, b) of the terminal 100 by solving the following simultaneous equations using the distances $d\theta_{1-1}$ and $d\theta_{2-1}$ between the terminal 100 and the reflection points P1 and P2 for the reflected wave, or using the propagation distance $d\theta 0$ between the terminal 100 and the AP 200 for the direct wave.

[Equation 1]

$$\sqrt{(x1-a)^2+(y1-b)^2}=d\theta 0 \quad (4)$$

$$\sqrt{(x2-a)^2+(y2-b)^2}=d\theta_{1-1} \quad (5)$$

$$\sqrt{(x3-a)^2+(y3-b)^2}=d\theta_{2-1} \quad (6)$$

The position measurement unit 222 computes the position T (a, b) by solving the simultaneous equations of expression (4) to expression (6). For example, as FIG. 5 illustrates, expression (4) represents a circle indicating by an arc d'θ0, expression (5) represents a circle indicating by an arc $d'\theta_{1-1}$, and expression (6) represents a circle indicating an arc $d'\theta_{2-1}$. The position measurement unit 222 determines the coordinates of the intersection of the three arcs: d'θ0, $d'\theta_{1-1}$ and $d'\theta_{2-1}$, that is, the position T (a, b) of the terminal 100, by solving the three simultaneous equations.

<Reflected Wave and Direct Wave>

Figure 8:
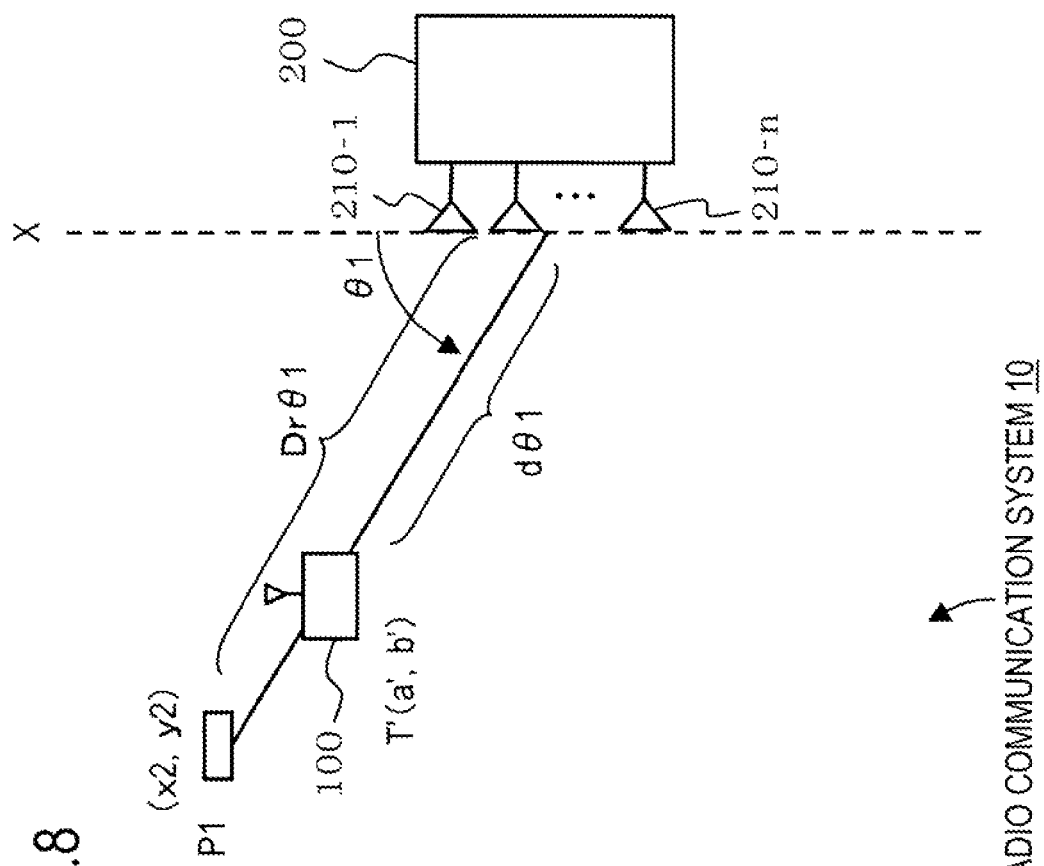
FIG. 8 illustrates an example of a propagation path of a received wave.

As FIG. 5 illustrates, when the terminal 100 is located at the position T' on the path connecting the AP 200 and the reflection point P1, the AP 200 receives, not the reflected wave from the terminal 100, but the direct wave. FIG. 8 illustrates an example of the positional relationship between the terminal 100 and the AP 200 in this case. Here even if the position measurement unit 222 computes expression (5), it is not computed as the reflected wave, so the position T' (a', b') in FIG. 5 is not computed. In such a case, the position measurement unit 222 computes the position not as the reflected wave but as the direct wave, that is, the position measurement unit 222 substitutes the propagation distance dθ1 between the terminal 100 and the AP 200 for the right hand side of expression (5), and computes expression (5).

Therefore it is important for the AP 200 to determine whether the receive wave from the terminal 100 is the direct wave or reflected wave. According to the present embodiment, the decision unit 221 executes such determination. In other words, if the determination result is the reflected wave, the decision unit 221 outputs the distance $d\theta_{1-1}$ from the reflection point P1 to the terminal 100 (calculated using expression (2)) to the position measurement unit 222. The position measurement unit 222 substitutes the distance $d\theta_{1-1}$ for the right hand side of expression (5), and computes expression (5).

On the other hand, if the determination result is the direct wave, the decision unit 221 outputs the propagation distance dθ1 calculated by the propagation distance calculation unit 218 to the position measurement unit 222. The position measurement unit 222 substitutes the propagation distance dθ1 output from the decision unit 221, for the right hand side dθ0 of expression (4), and computes expression (4).

Figure 9:
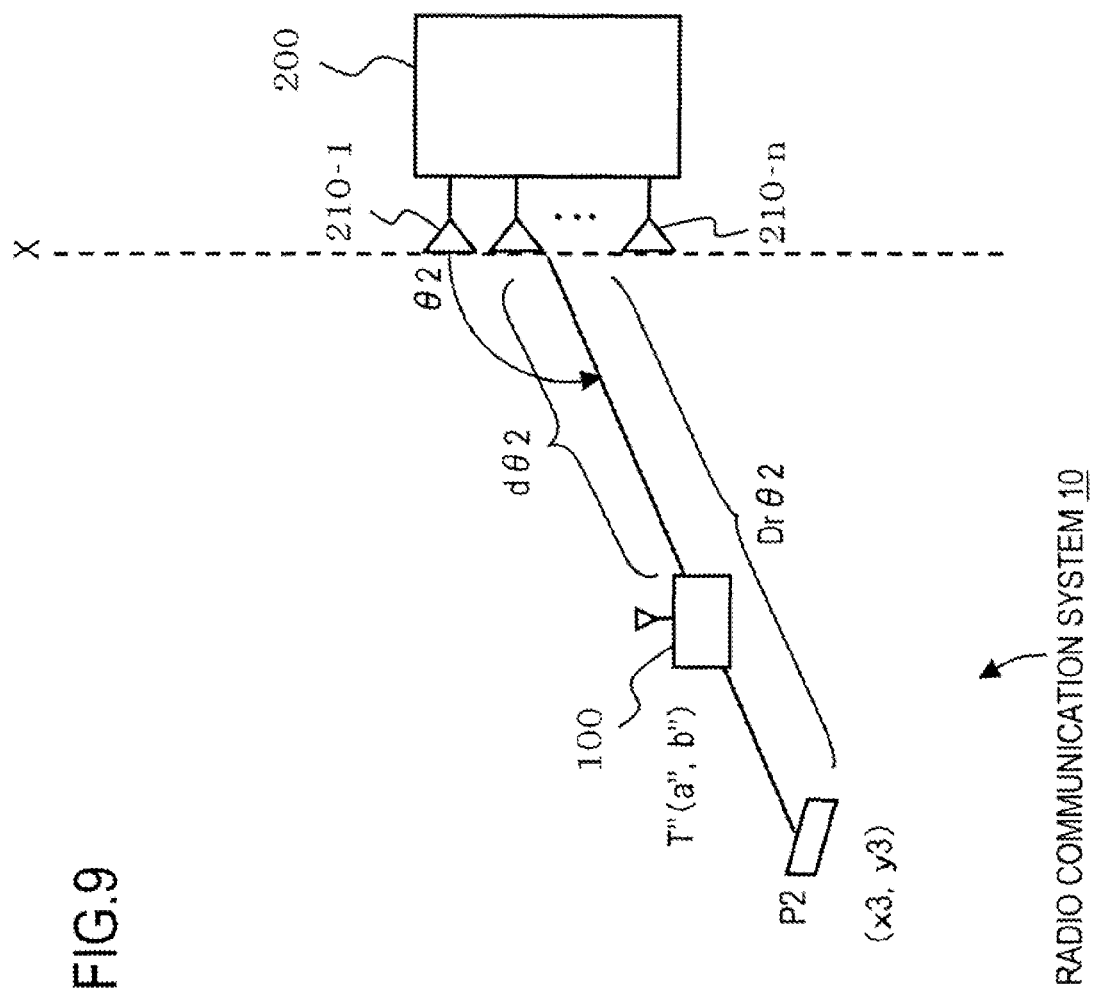
FIG. 9 illustrates an example of a propagation path of a received wave.

Determination is performed as follows, for example. As FIG. 8 illustrates, when the terminal 100 is located on the path between the reflection point P1 and the AP 200, the relationship of the distance Drθ1 between the AP 200 and the reflection point P1, and the propagation distance dθ1 represents dθ1<Drθ1. On the other hand, if the reflected wave arrives at the AP 200 via the reflection point P1, as FIG. 6 illustrates, then the relationship of the distance Drθ1 and the propagation distance dθ1 represents dθ1>Drθ1. Therefore comparing the propagation dθ1 calculated by the propagation distance calculation unit 218 and the distance Drθ1 calculated by the reflection point distance calculation unit 220, for example, the decision unit 221 determines as:

the direct wave if dθ1≦Drθ1 is satisfied, or
the reflected wave if dθ1>Drθ1 is satisfied This is the same for the reflection point P2. FIG. 9 illustrates an example when the terminal 100 is located at the position T'' (a'', b'') on the path connecting the reflection point P2 and the AP 200. The decision unit 221 determines as the direct wave if dθ2≦Drθ2 is satisfied, and as the reflected wave if dθ2>Drθ2 is satisfied, for example. If the determination result is the direct wave, the decision unit 221 outputs the propagation distance dθ calculated by the propagation distance calculation unit 218 to the position measurement unit 222. The position measurement unit 222 substitutes the propagation distance dθ2 for the right hand side of expression (4), and computes expression (4).

If the determination result is the reflected wave, the decision unit 221 outputs the distance $d\theta_{2-1}$ between the reflection point P2 and the terminal 100 to the position measurement unit 222. The position measurement unit 222 substitutes the distance $d\theta_{2-1}$ for the right hand side of expression (6), and computes expression (6).

In this way, the decision unit 221 discerns the direct wave and reflected wave, and the position measurement unit 222 computes the positional coordinates of the terminal 100 by substituting the propagation distance dθ1, AP 200 (x1, y1), and reflection points P1 (x2, y2) and P2 (x3, y3) for the right hand side of expression (4) to expression (6) respectively, solving the simultaneous equations of expression (4) to expression (6). In the case of the example in FIG. 8, the decision unit 221 determines as the direct wave, and outputs the propagation distance dθ1 to the position measurement unit 222, and the position measurement unit 222 substitutes the propagation distance dθ1 for the right hand side of expression (4), and computes expression (4). In this case, the decision unit 221 and so on computes the distance $d\theta_{2-1}$ between the reflection point P2 and the terminal 100 based on the reception level of another reflected wave and so on, such as the reflected wave on the path via the reflection point P2, and the position measurement unit 221 computes expression (6). The position measurement unit 221 measures the position (a, b) of the terminal 100 using expression (4) and expression (6). For example, if there is the reflected wave from still another reflection point, the position measurement unit 221 computes three simultaneous equations with changing x1, y1 or the like of expression (5) or expression (6) with position coordinates of the other reflection point.

In FIG. 4 or the like, the AP 200 receives the direct wave having the propagation path dθ0 from the terminal 100. In this case, the decision unit 221 determines as follows: the decision unit 221 inputs the angles (arrival angles) θ1 and θ2 which correspond to the distance Drθ1 and Drθ2 respectively, from the reflection point distance calculation unit 220 along with the distance Drθ1 and Drθ2. On the other hand, the reception level detection unit 216 detects the reception level when the angles of the array antennas 210-1 to 210-n are changed. Therefore when the decision unit 221 inputs and detects with respect to the arrival angles θ1 and θ2 and the respective reception levels of these angles a peak reception level other than these angles, the decision unit 221 can determine that the direct wave is being received from the terminal 100. The reflection points P1 and P2 are disposed in the direction of angles θ1 and θ2, so if the reception level detection unit 216 detects the peak reception level in a direction other than these directions, the wave is the reception wave which is received, not via the reflection points P1 and P2, and the decision unit 221 can determine this received wave as the direct wave. The propagation distance calculation unit 218 calculates the propagation distance dθ at this peak reception level, and outputs this angle at this peak reception level (θ0 in the example in FIG. 4), and the propagation distance dθ to the decision unit 221. When the decision unit 221 inputs an angle other (e.g. θ0) than the angles θ1 and θ2 from the reflection point distance calculation unit 220, from the propagation distance calculation unit 218, the decision unit 221 determines this received wave at this angle as the direct wave, and outputs the propagation distance dθ0 to the position measurement unit 222.

In this way, the decision unit 221 compares the distance Drθ1 and Drθ2 with the propagation distance dθ1 and dθ2 measured at the angles θ1 and θ2 respectively, and determines whether the received wave is the direct wave (e.g. FIG. 8 and FIG. 9) or the reflected wave (e.g. FIG. 6 and FIG. 7). The determination method is as mentioned above. On the other hands, the decision unit 221 outputs to the position measurement 222 the propagation distance dθ0 at the angle θ0 other than the angles θ1 and θ2 as the received wave.

<Position Measurement Example when Terminal 100 Moved to Another Position>

Figure 10:
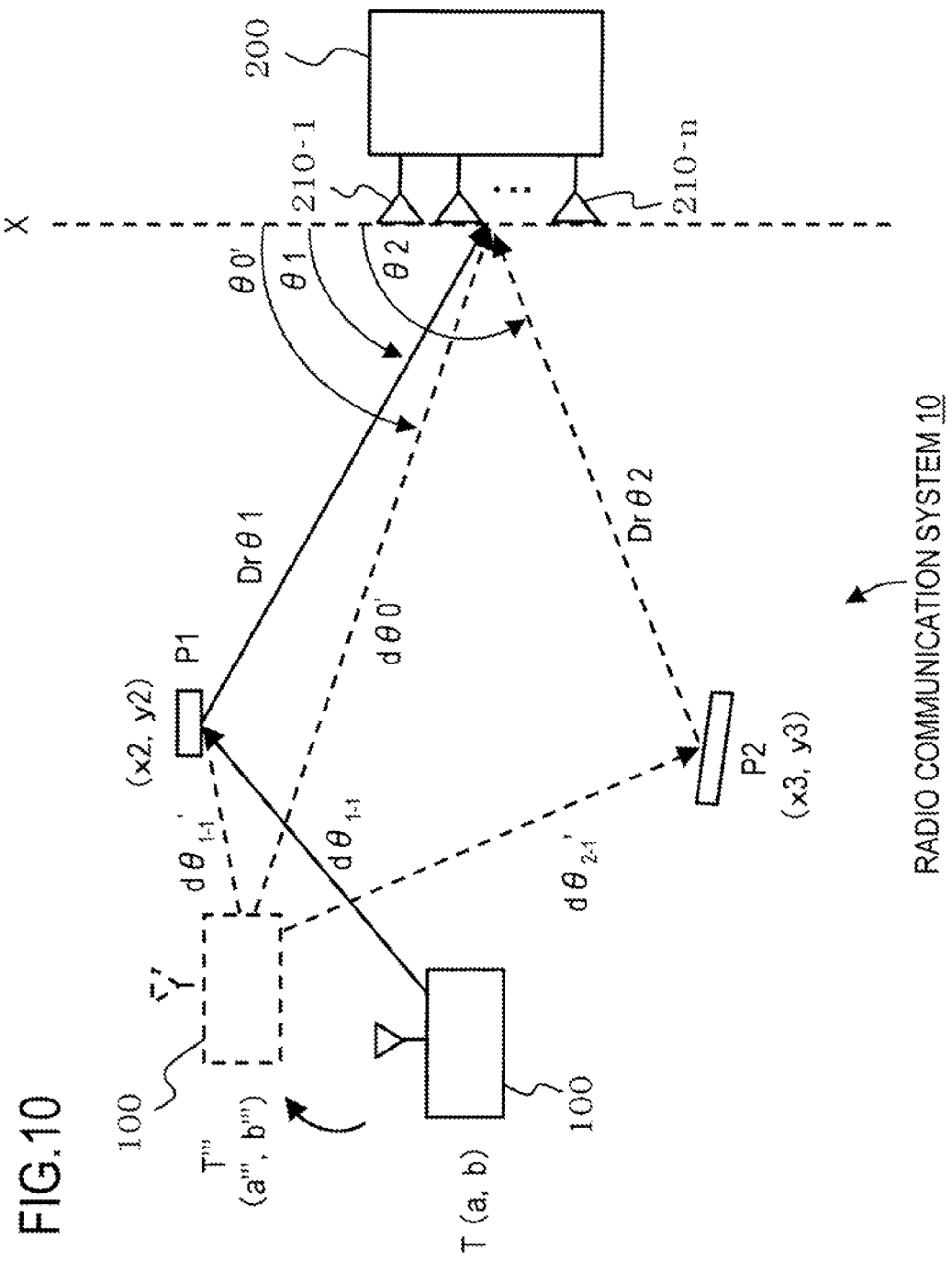
FIG. 10 illustrates an example of a propagation path of a received wave.

In the example in FIG. 4 or the like, an example of the terminal 100 located at position T (a, b) is described. If the terminal 100 moves to position T", other than T' and T", the AP 200 can measure the position T''' of the terminal 100 in the same manner. FIG. 10 illustrates an example of the path of the received wave in such a case.

The propagation distance calculation unit 218 calculates the propagation distance dθ1 and dθ2 at angles θ1 and θ2 with respect to the reflection points P1 and P2 respectively. The reception level detection unit 216 detects the peak reception level at the angle θ0', and the propagation distance calculation unit 218 calculates the propagation distance dθ0' at angle θ0'.

Comparing the propagation distance dθ1 and the distance Drθ1 between the AP 200 and the reflection point P1, the decision unit 221 determines whether the received wave at arrival angle θ1 is the direct wave or reflected wave. If the decision unit 221 determines the reflected wave as the determination result, the decision unit 221 computes the distance $dθ_{1-1'}$, between the reflection point P1 and the terminal 100 using expression (2), and outputs the distance $dθ_{1-1'}$, to the position measurement unit 222. The position measurement unit 222 substitutes the distance $dθ_{1-1'}$, for the right hand side of expression (5), and computes expression (5). If the decision unit 221 determines the received wave as the direct wave, the decision unit 221 outputs the propagation distance dθ1 to the position measurement unit 222, the position measurement unit 222 substitutes the propagation distance dθ1 for the right hand side of expression (4), and computes expression (4).

This position measurement method is also the same for the path with respect to the reflection point P2. If the decision unit 221 determines the received wave at arrival angle θ2 as the reflected wave, the decision unit 221 computes the distance $dθ_{2-1'}$, between the reflection point P2 and the terminal 100 using expression (3), and outputs the result to the position measurement unit 222. The position measurement unit 222 substitutes the distance $dθ_{2-1'}$, for the right hand side of expression (6) and computes expression (6). If the decision unit 221 determines the received wave at arrival angle θ2 as the direct wave, the decision unit 221 outputs the propagation distance dθ2 to the position measurement unit 222. The position measurement unit 222 substitutes the propagation distance dθ2 for the right hand side of expression (4), and computes expression (4).

Furthermore, the reception level detection unit 216 detects a peak of the reception level at the arrival angle θ0', and the propagation distance calculation unit 218 calculates the propagation distance dθ0' at the arrival angle θ0'. Since the received wave is at arrival angle θ0' other than angles θ1 and θ2, the decision unit 221 determines this received wave as the direct wave (determines as the received wave at an angle where the reflection point does not exist), and outputs the propagation distance dθ0' to the position measurement unit 222. The position measurement unit 222 substitutes the propagation distance dθ0' for the right hand side of expression (4), computes the simultaneous equations of expression (4) to expression (6), and computes the position T''' (a''', b''') of the terminal 100. In this case, the position measurement unit 222 computes "a" and "b" of expression (4) to expression (6) as "a'''" and "b'''".

In this way, even if the terminal 100 moves to another position T''', the AP 200 can measure the position of the terminal 100, in the same manner as the case of the terminal 100 locating at position T.

<Example of Position Measurement when Obstacle Exists>

Figure 11:
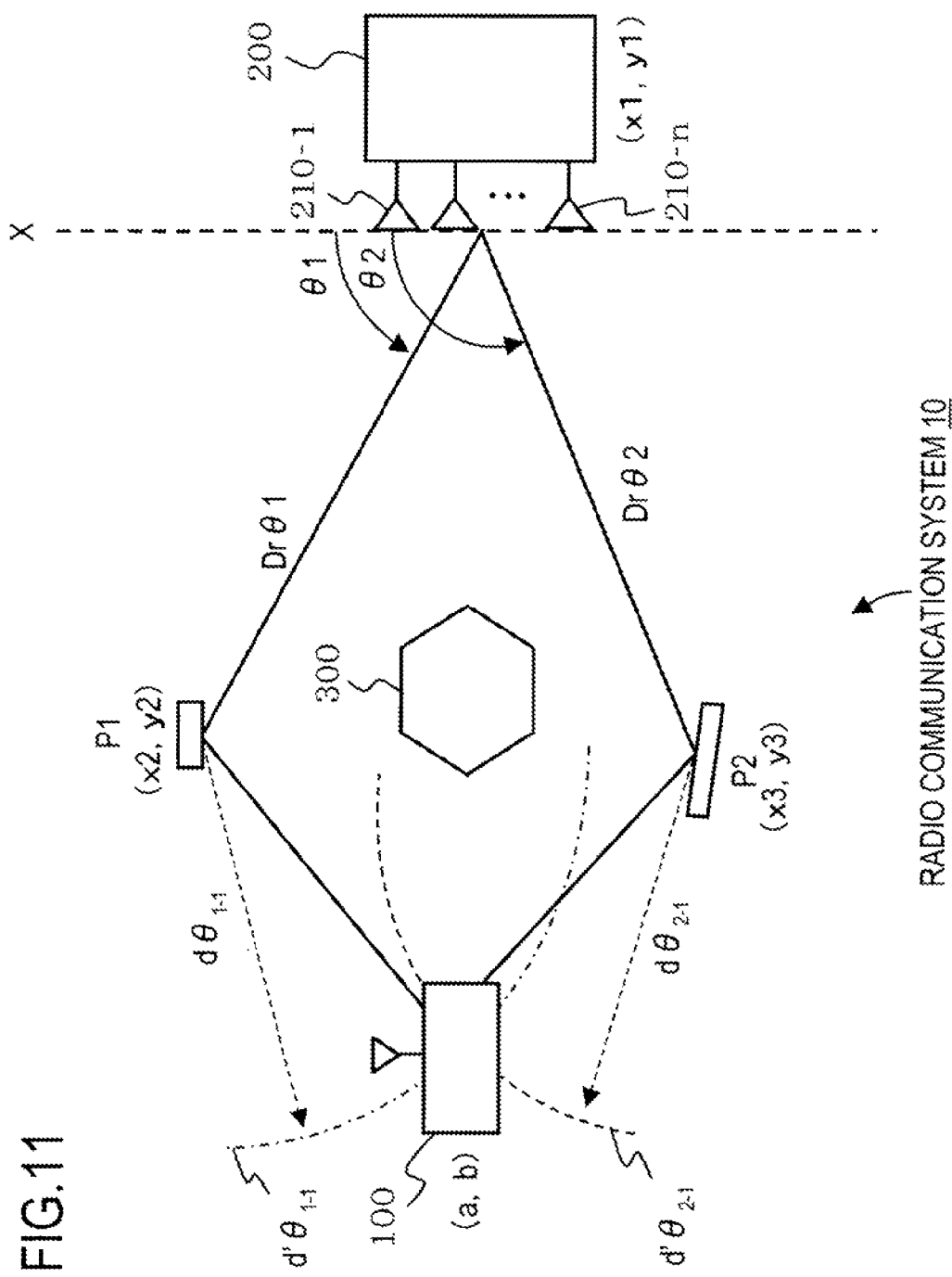
FIG. 11 illustrates an example of a propagation path of a received wave.

The example described above is an example of the AP 200 receiving radio signals which are input via three paths. But, for example, the AP 200 may not be able to receive radio signal from a certain path because of an obstacle. FIG. 11 illustrates an example of such a case.

In FIG. 11, an obstacle 300 is located on a segment connecting the terminal 100 and the AP 200. Because the obstacle 300 is located on the path of the direct wave, the AP 200 cannot receive the direct wave from the terminal 100. In this case, the AP 200 computes the position T (a, b) of the terminal 100 using the received waves (both reflected waves in the example of FIG. 11) from the two paths.

In this case, like the above mentioned example, the propagation distance calculation unit 218 calculates the propagation distance dθ1 (=Drθ1+$dθ_{1-1}$) of the reflected wave via the reflection point P1, and the propagation distance dθ2 (=Drθ2+$dθ_{2-1}$) of the reflected wave via the reflection point P2.

The decision unit 221 determines whether the received waves from the two paths are the direct wave or reflected wave, determines both received waves as reflected waves in this case, computes the distance $dθ_{1-1}$ and $dθ_{2-1}$ between the reflection points P1 and P2 and the terminal 100 using expression (2) and expression (3), and outputs the result to the position measurement unit 222.

The position measurement unit 222 computes the positional coordinates (a, b) of the terminal 100 using expression (5) and expression (6). At this time, two solutions exist for the computed positional coordinates (a, b). However the other solution is a solution indicating a position which cannot exist in the position relationship illustrated in FIG. 11.

When the position measurement unit 222 measures with two received waves like this, it is preferable that the position measurement unit 222 holds estimated range of the positional coordinates (a, b) in advance, so that a solution using two simultaneous equations, out of expression (4) to expression (6), which is within the estimated range, is selected.

For example, when the obstacle 300 is located on the segment connecting the reflection point P1 and the AP 200 as well, the decision unit 221 can perform the computation in the same manner.

<Another Example of Reflection Point>

Figure 12:
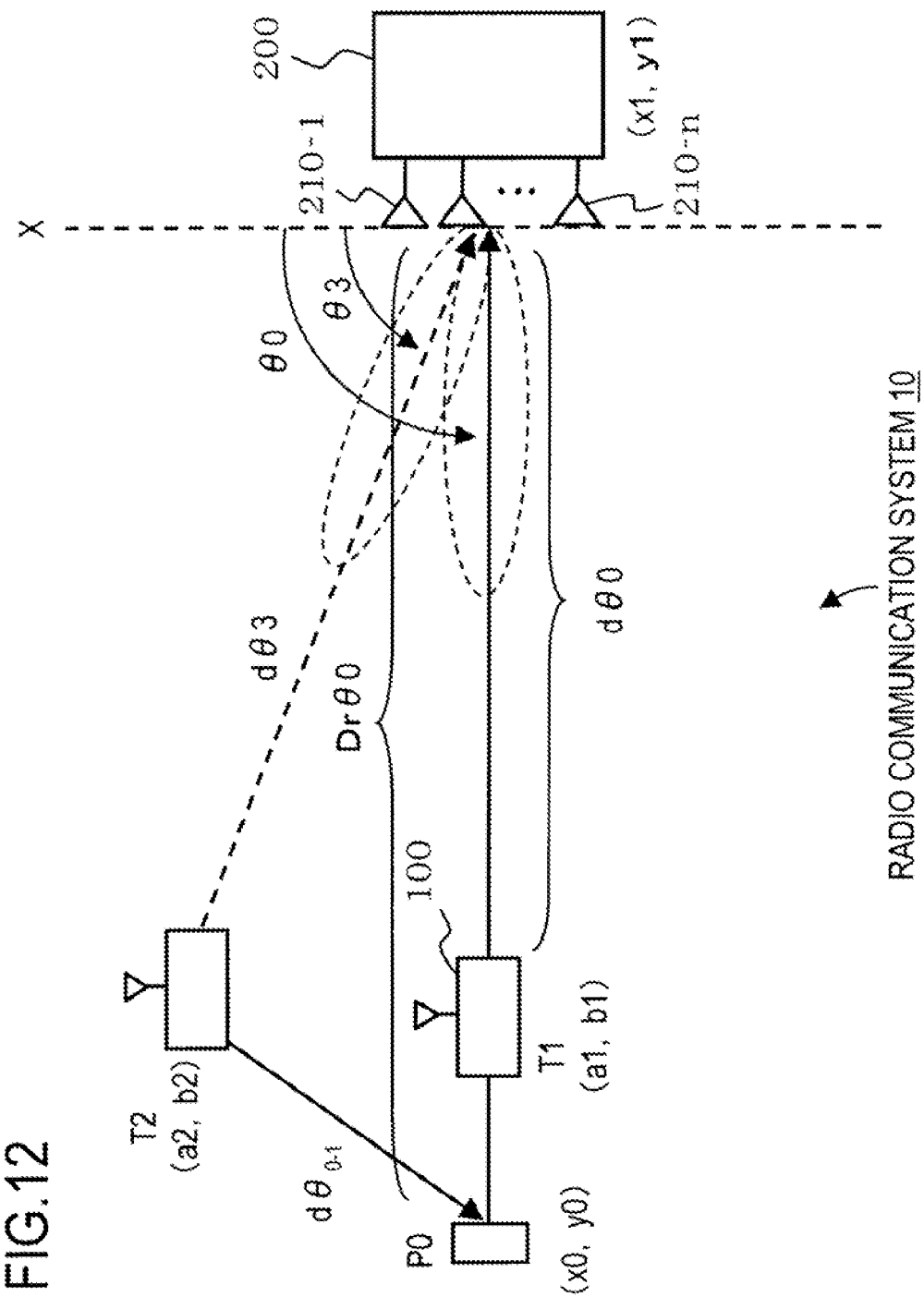
FIG. 12 illustrates an example of a propagation path of a received wave.

There are various variations of reflection points P1 and P2. FIG. 12 illustrates an example of the positional relationship of a reflection point P0 and so on when the reflection point P0 is disposed. In the example illustrated in FIG. 12, the reflection point P0 exists in the direction at angle θ0 illustrated in FIG. 4. It is assumed that the reflection point distance calculation unit 220 calculates a position P0 (x0, y0) of the reflection point P0, then calculates the distance Drθ0 and angle θ0 with respect to the reflection point P0 in advance.

If the terminal 100 is located in a position T1 (a1, b2) on a segment connecting the reflection point P0 and the AP 200, the position of the reflection point P0 is calculated as follows, for example. The reflection point P0 is located at angle dθ0, so the propagation distance calculation unit 218 calculates the propagation distance dθ0 at angle θ0. Then the decision unit 221 compares the distance Drθ0 between the AP 200 and the reflection point P0 with the propagation distance dθ0. In the case of the example in FIG. 12, the decision unit 221 determines that the received wave is the direct wave since dθ0<Drθ0, and outputs the propagation distance dθ0 to the position measurement unit 222. The position measurement unit 222 substitutes the propagation distance dθ0 for the right hand side of expression (4), and computes expression (4). The position measurement unit 222 or the like processes in the same manner as the above mentioned example using another path of the radio signal transmitted from the terminal 100, and computes the simultaneous equations of expression (4) to expression (6) for example.

On the other hand, if the terminal 100 is located in a position T2 (a2, b2) which is not on the segment connecting the AP 200 and the reflection point P0, the propagation distance dθ0 on the path of the reflected wave is obtained by following expression.

$$d\theta0 = Dr\theta0 + d\theta_{0-1} \tag{7}$$

The AP 200 receives a wave at a predetermined level at the arrival angle θ0. The decision unit 221 determines that the received wave is the reflected wave since the relationship of the propagation distance dθ0 and the distance Drθ0 is dθ0>Drθ0, computes the distance $d\theta_{0-1}$ between the reflection point P0 and the terminal 100 using expression (7), and outputs the distance $d\theta_{0-1}$ to the position measurement unit 222.

The reception level detection unit 216 and the propagation distance calculation unit 218 detect the peak reception level at the arrival angle θ3, and the decision unit 221 determines that the received wave at angle θ3 is the direct wave since the detection angle is an angle other than angle θ0. The decision unit 221 outputs the propagation distance dθ3 calculated by the propagation distance calculation unit 218 to the position measurement unit 222.

Based on the two received waves, the position measurement unit 222 substitutes the distance $d\theta_{0-1}$ for the right hand side ((x2, y2) is regarded as (x0, y0)) of expression (5), and the propagation distance dθ3 for the right hand side of expression (4), so as to compute the position (a2, b2). If there is the reflected wave from another path, the position measurement unit 222 substitutes this distance for the right hand side of expression (6) ((x3, y3) is regarded as coordinates of the reflection point of this reflected wave), so as to compute the position (a2, b2).

Operation Example

Figure 13:
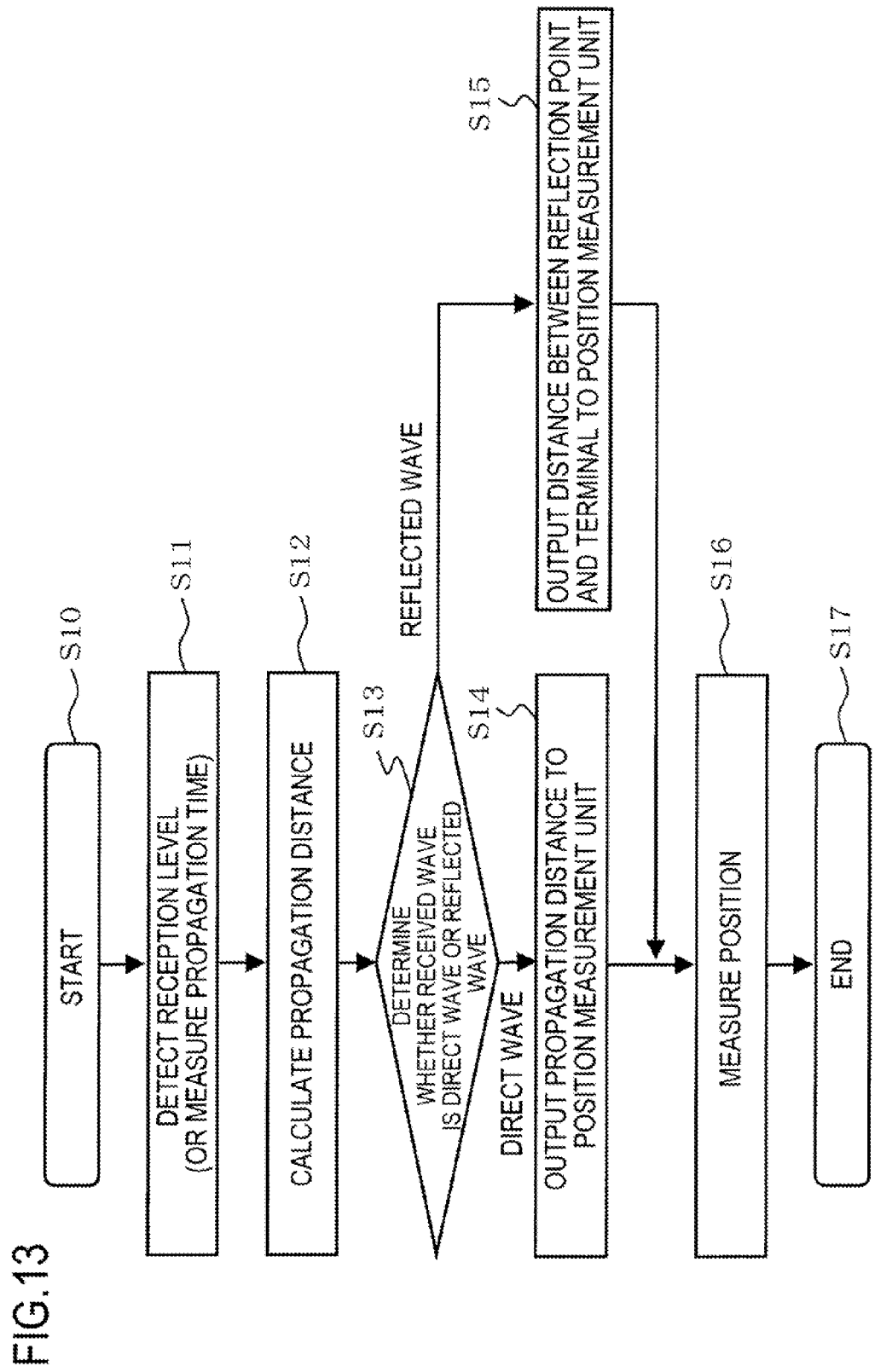
FIG. 13 is a flow chart depicting an operation example.

FIG. 13 is a flow chart depicting an operation example executed in the AP 200. This operation will be described in brief, since details is already described.

Firstly, when the AP 200 starts a processing (S10), the AP 200 detects the reception level of the received wave at each angle while scanning the array antennas 210-1 to 210-n for the predetermined angle at a time, or measures the propagation time (S11). For example, the reception level detection unit 216 detects the reception level, and the propagation time measurement unit 217 measures the propagation time.

Next, the AP 200 calculates the propagation distance dθ (S12). For example, the propagation distance calculation unit 218 calculates the propagation distance dθ by searching the table based on the reception level (FIG. 3C). Or the propagation distance calculation unit 218 calculates the propagation distance dθ by multiplying the propagation time t by the radio wave speed c.

Next, the AP 200 determines whether the received wave is the direct wave or reflected wave (S13). For example, the decision unit 221 compares the propagation distance dθ1 and dθ2 of the received waves at the angles θ1 and θ2 of the reflection points P1 and P2, with the distance Drθ1 and Drθ2 between the AP 200 and the reflection points P1 and P2.

Next, when the AP 200 determines the received wave as the direct wave ("direct wave" in S13), the AP 200 outputs the propagation distance to the position measurement unit 222 (S14). For example, when the decision unit 221 determines the direct wave, the decision unit 221 outputs the propagation distance dθ0 to the position measurement unit 222.

On the other hand, when the AP 200 determines the received wave as the reflected wave ("reflected wave" in S13), the AP 200 computes the distance between the reflection point and the terminal 100, and outputs the distance to the position measurement unit 222 (S15). For example, when the decision unit 221 determines the reflected wave, the decision unit 221 computes the distance $d\theta_{1-1}$ and $d\theta_{2-1}$ between the reflection points P1 and P2 and the terminal 100 using expression (2) or the like, and outputs to the position measurement unit 222.

Next, then the AP 200 measures the position of the terminal 100 (S16). For example, the position measurement unit 222 measures the position of the terminal 100 by substituting the propagation distance dθ1, AP 200 (x1, y1), reflection points P1 (x2, y2) and P2 (x3, y3) and so on, for the right hand side of expression (4) to expression (6), and solving the simultaneous equations.

Then, the series of processing ends (S17).

In this way, the AP 200 determines whether the received waves from the reflection points P0 to P2 and so on are the direct wave or reflected wave, and based on this result, measures the positional coordinates of the terminal 100 by substituting the propagation distance dθ1, distance Drθ1 or the like for the right hand side of expression (4) to expression (6) (for the coordinates of the reflection point, coordinates corresponding to the reflection point are used). Therefore, since the AP 200 can measure the positional coordinates of the terminal 100, the AP 200 can measure the position of the terminal 100 at high precision.

Other Embodiments

Figure 14:
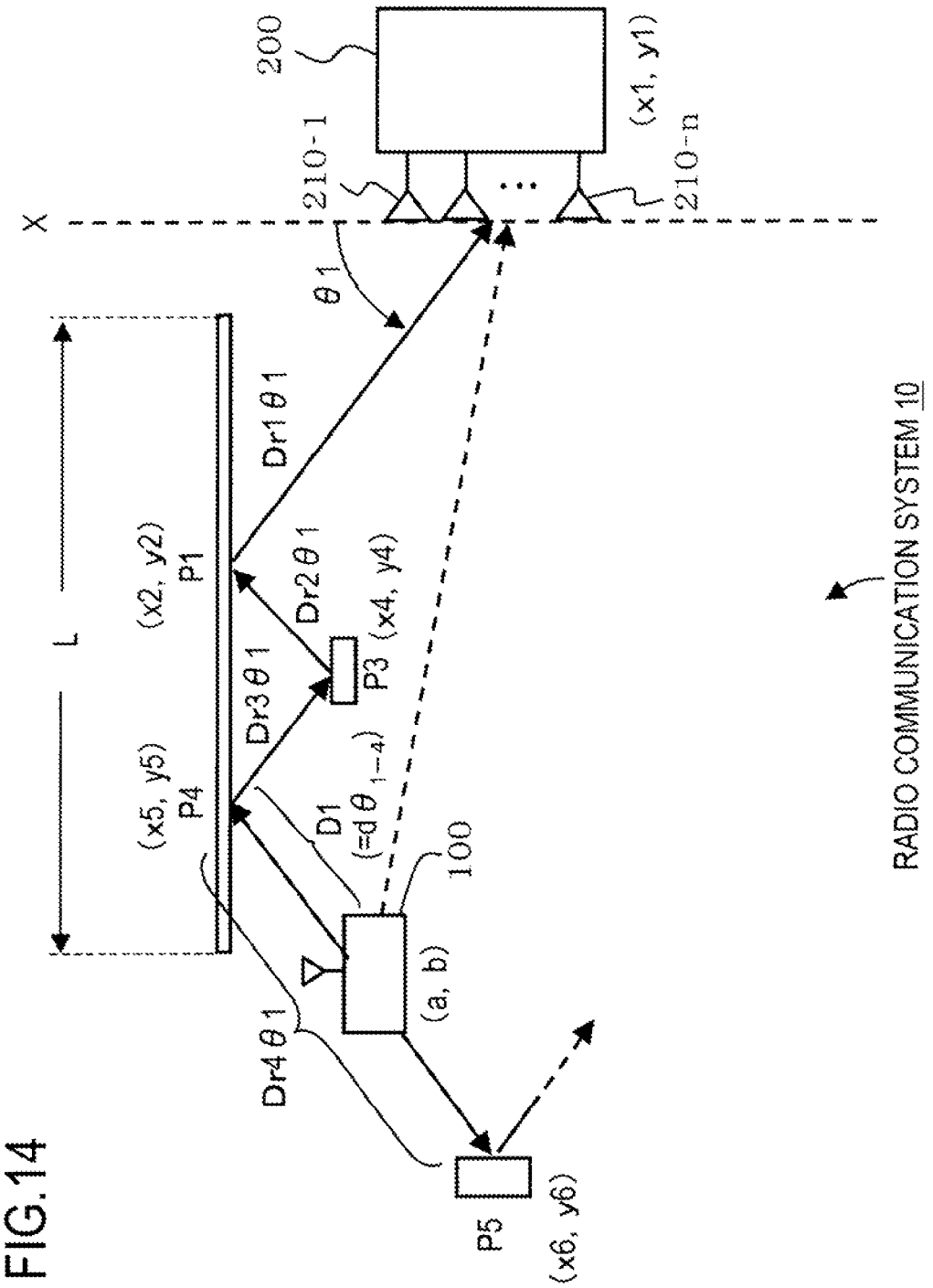
FIG. 14 illustrates an example of a propagation path of a received wave.

Other embodiments will now be described. In the above example, a case when the number of times of reflection is once is described. But multiple reflections, in which a number of times of reflection is two or more, is also possible depending on the shape of the room, arrangement of measuring instruments or the like. FIG. 14 illustrates an example of the paths of received waves in the case of multiple reflections. FIG. 14 is an example when four reflection points, P1 and P3 to P5, are disposed, and the terminal 100 is located on the path connecting the reflection point P4 and the reflection point P5.

In FIG. 14, it is assumed that the distance between the AP 200 and the reflection point P1 is Dr1θ1, the distance between the reflection points P1 and P3 is Dr2θ1, the distance between the reflection points P3 and P4 is Dr3θ1, and the distance between the reflection points P4 and P5 is Dr4θ1. It is assumed that the positional coordinates of each reflection point P3 to P5 is (x4, y4), (x5, y5) and (x6, y6), respectively. It is also assumed that the propagation distance when the terminal 100 is located in position (a, b) illustrated in FIG. 14 is dθ0.

If the AP 200 determines the received wave as the reflected wave, the AP 200 measures a distance D1 which is a distance from the terminal 100 to the reflection point closest to the terminal 100 on the path extending to the AP 200. In the example in FIG. 14, the AP 200 measures the distance $d\theta_{1-4}$ (=D1) between the reflection point P4 and the terminal 100. And, the AP 200 substitutes the measured distance D1 (distance $d\theta_{1-4}$ in the case of the example in FIG. 14) for the right hand side of expression (5) or expression (6), and computes it. It is assumed that (x2, y2) or (x3, y3) of expression (5) or expression (6) is regarded as (x5, y5). If another reflected wave or direct wave exists, the position measurement unit 222 or the like substitutes it for the right hand side of expression (4) to expression (6), and changes (x1, y1), (x2, y2) or (x3, y3) according to the coordinates of the reflection point, and computes the simultaneous equations.

Figure 15:
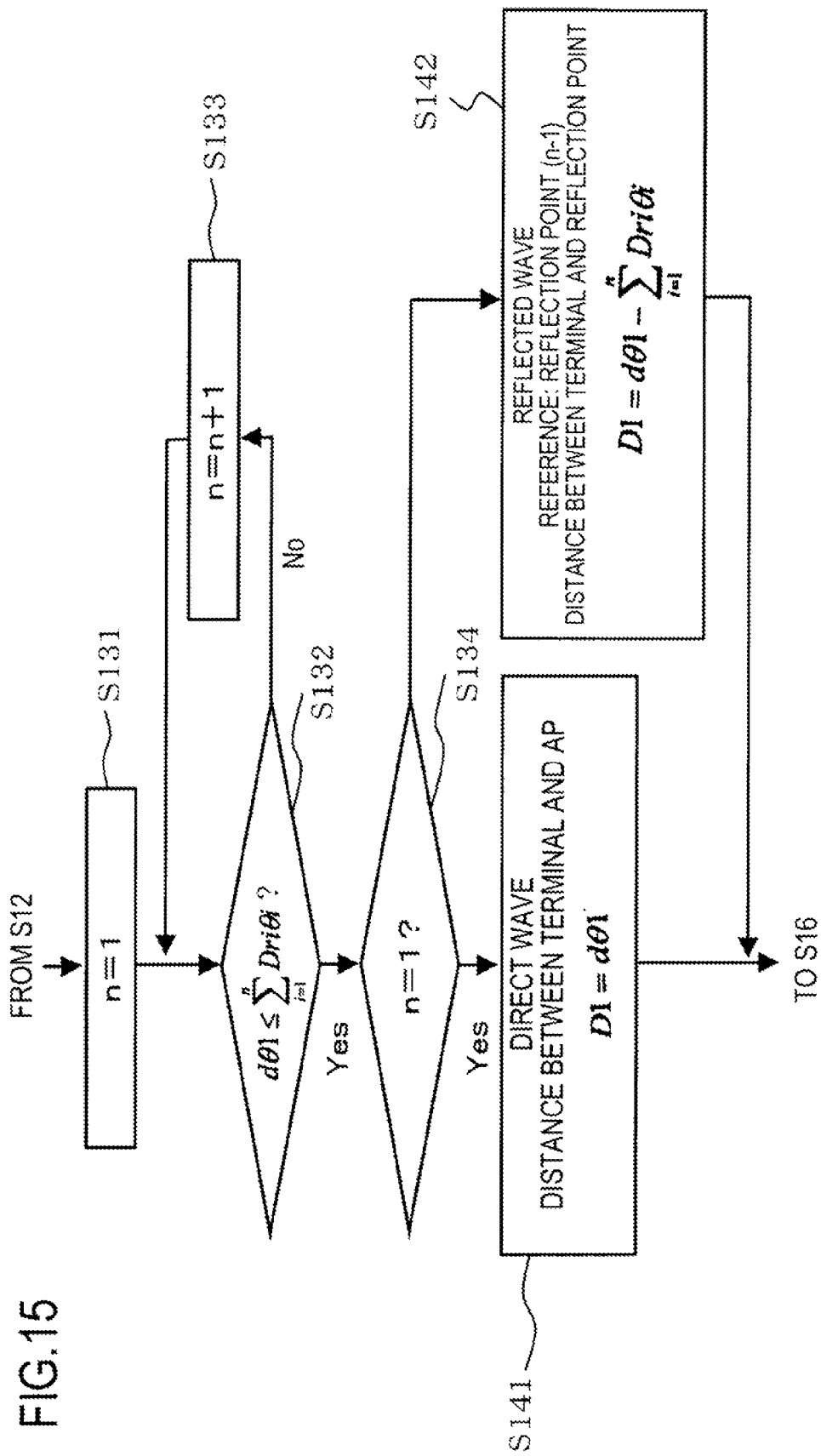
FIG. 15 is a flow chart depicting an operation example.

The distance D1 is determined as follows. FIG. 15 is a flow chart depicting an example of a method for determining the distance D1. For example, the flow chart in FIG. 15 corresponds to S13 and S14 illustrated in FIG. 13.

The propagation distance calculation unit 218 of the AP 200 calculates the propagation distance dθ1 with the terminal 100 (S12), then the decision unit 221 substitutes "1" for the number of times of reflection n (S131).

Next, the decision unit 221 determines whether the propagation distance dθ1 satisfies the following expression (8) (S132).

[Equation 2]

$$d\theta1 \le \sum_{i=1}^{n} Dri\theta i \qquad (8)$$

Expression (8) is an expression to determine which area the terminal 100 is located, between the AP 200 and the reflection point or between reflection points, for example. For example, if the terminal 100 is located on a path between the AP 200 and the reflection point P1 in FIG. 14, the propagation distance dθ1 satisfies dθ1<Drθ1, where Drθ1 is a distance between the AP 200 and the reflection point P1, and S132 is determined as YES. If the terminal 100 is located between the reflection points P1 and P3, the propagation distance dθ1 satisfies dθ1>Dr1θ1 (NO in S132), but the propagation distance dθ1 satisfies dθ1<(Dr1θ1+Dr2θ1) (YES in S132). In the case of the example in FIG. 14, the propagation distance dθ1 satisfies dθ1>(Dr1θ1+Dr2θ1+Dr3θ1) (NO in S132), but the propagation distance dθ1 satisfies dθ1<(Dr1θ1+Dr2θ1+Dr31+Dr4θ1) (YES in S132).

If expression (8) is not satisfied (NO in S132), the decision unit 221 adds "1" to n (S133), and determines whether expression (8) is satisfied.

If expression (8) is satisfied, the decision unit 221 determines whether n is "1" or not (S134). For example, the decision unit 221 determines whether the terminal 100 is located on a path connecting the AP 200 and the reflection point P1, and whether the direct wave is received from the terminal 100 or not.

If n is "1" (YES in S134), the decision unit 221 determines the received wave as the direct wave, and the distance D1 is a value that satisfies the following expression (9) (S141).

[Equation 3]

$$D1 = d\theta1 \qquad (9)$$

If n is not "1" (NO in S134), the decision unit 221 determines the received wave as the reflected wave, and the distance D1 is a value that satisfies the following expression (10).

[Equation 4]

$$D1 = d\theta1 - \sum_{i=1}^{n} Dri\theta i \qquad (10)$$

In the example in FIG. 14, the distance D1 becomes D1=dθ1−(Dr1θ1+Dr2θ1+Dr3θ1), and the reflection point to be a base point is the reflection point P4.

When the decision unit 221 ends the processing of S141 and S142, the decision unit 221 moves the processing to S16 in FIG. 13, the position measurement unit 222 substitutes the distance D1 for the right hand side of one of expression (4) to expression (6), and processes it. In the case of the example in FIG. 14, there is one path, but a plurality of paths may exist, and if the received wave is received from another path, the position measurement unit 222 executes the above mentioned processing, substitutes the distance D1 for expression (4) to expression (6), and processes it.

In this way, even if the reflected wave from the terminal 100 repeats reflection the plurality of times, the AP 200 can perform processing in the same manner as the above mentioned example by measuring the distance D1 to the closest reflection point on the path from the terminal 100 to the AP 200. Therefore even if reflection is repeated for the plurality of times, this AP 200 can measure the position of the terminal 100 at high precision.

Figure 16:
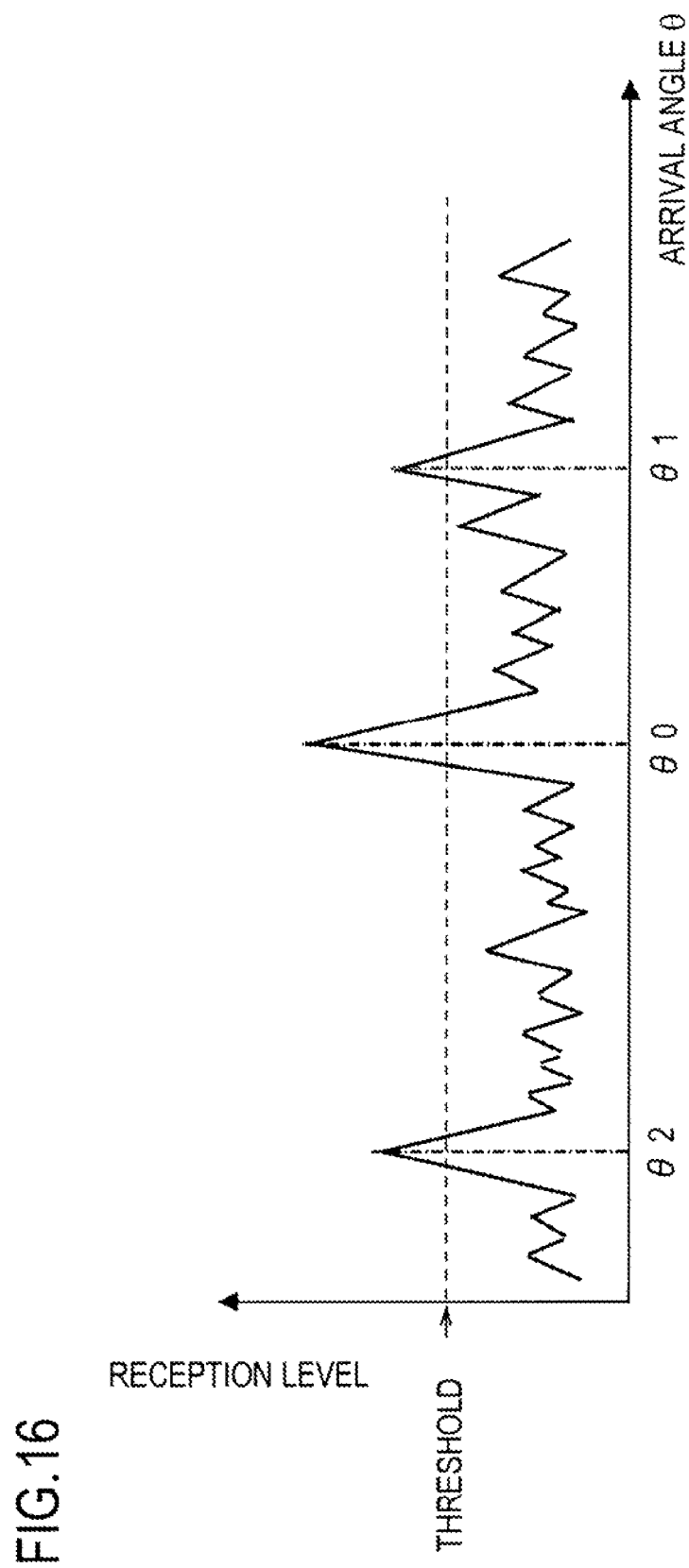
FIG. 16 is a graph depicting an example of the relationship between the reception level and the arrival angle.

In the above examples, the AP 200 measures the position of the terminal 100 by receiving the received waves on three or two paths, and substituting each value for expression (4) to expression (6). For example, the AP 200 may receive three or more waves to measure the position of the terminal 100. Or the AP 200 may detect the reception level for each scanning angle of the array antennas 210-1 to 210-n. FIG. 16 illustrates an example of the relationship between the reception level and the arrival angle θ. The reception level detection unit 216 detects the reception level for each scanning angle. In this case, the reception level detection unit 216 selects the highest three (or two) reception levels for example, and outputs to the propagation distance calculation unit 218. In the example of FIG. 4, two of the selected three reception levels are the reception levels at certain angles θ1 and θ2 of the reflection points P1 and P2, which are held in advance. This is because the reflection points P1 and P2 are disposed at these angles θ1 and θ2 in advance, and the AP 200 receives the reflected waves from the reflection points P1 and P2. For example, even if there are three or more reflection points, the reception level detection unit 216 may select the highest three reception levels, and output to the distance calculation unit 218. The decision unit 221 determines whether the three received waves are the direct wave or the reflected wave, and the position measurement unit 222 measures the position of the terminal 100 by computing expression (4) to expression (6) in the same manner as the above described examples based on the highest three reception levels.

In the description on the above examples, the AP 200 includes both the reception level detection unit 216 and the propagation time measurement unit 217. However as illustrated in FIG. 17, the AP 200 may not include the propagation time measurement unit 217. Or as illustrated in FIG. 18, the AP 200 may not include the reception level detection unit 216.

In the description on the above examples, predetermined reflection points are disposed, and the AP 200 detects the reception level or the like at the angle of each reflection point. For example, in the predetermined angle range of the array antennas 210-1 to 210-n, the position of the reflection point and the distance of the reflection point and so on may be calculated at each scanning angle. For example, in range L in FIG. 14, m number of reflection points P1 to Pm may be disposed for each scanning angle. The AP 200 can measure the position of the terminal 100, as the above described, by calculating the propagation distance $d\theta$ based on the highest three reception levels, determining whether each wave is the reflected wave or direct wave, and substituting $d\theta$, the positional coordinate of the AP 200, and the positional coordinates of each reflection point for each right hand side of expression (4) to expression (6). For example, in the example in FIG. 14, reflection points with respect to the wall having length L in the hospital or the like are calculated in advance, then the AP 200 can implement the same operation as the above examples by measuring the reception level or the like at each angle to each reflection point within range L.

The above examples are described using the AP 200 as an example of the radio communication apparatus. For example, the radio communication apparatus may be a radio base station apparatus, or a relay station apparatus. These apparatuses can also implement the above example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A radio communication apparatus for performing radio communication with a terminal apparatus, the radio communication apparatus comprising:
    a calculation unit which calculates first and second propagation distances indicating path lengths of the first and second paths respectively, when radio signals transmitted from the terminal apparatus at least via first and second paths are received as first and second received waves respectively;
    a decision unit which determines whether the first and second received waves are reflected waves reflected at first and second reflection points or direct waves without via the first and second reflection points, respectively, based on the first and second propagation distances, and outputs a first or second terminal-reflection point distance indicating a distance between the terminal apparatus and the first or second reflection points which is the closest to the terminal apparatus on the first or second path, respectively, on determining the first or second received wave as the reflected wave, or outputs the first or second propagation distance on determining the first or second received wave as the direct wave; and
    a position measurement unit which measures the position of the terminal apparatus based on the first or second terminal-reflection point distance, or the first or second propagation distance, output from the decision unit respectively.

2. The radio communication apparatus according to claim 1, wherein
    the decision unit determines the first or second received wave as the reflected wave respectively when the first or second propagation distances is equal to or longer than a first or second reflection point distance indicating a distance between the radio communication apparatus and the first or second reflection point which is the closest to the radio communication apparatus on the first or second path, or determines the first or second received wave as the direct wave respectively when the first or second propagation distance is shorter than the first or second reflection point distance respectively.

3. The radio communication device according to claim 1, wherein
    the position measurement unit measures the position of the terminal apparatus based on the first or second terminal-reflection point distance when the decision unit determines both the first and second received waves as the reflected wave.

4. The radio communication apparatus according to claim 1, wherein
    the calculation unit calculates the first and second propagation distances respectively based on received power levels of the first and second received waves, or propagation times of the first and second received waves.

5. The radio communication apparatus according to claim 1, further comprising:
    an array antenna which receives the radio signal by performing scanning at a predetermined scanning angle, wherein
    the calculation unit calculates a received power level for each scanning angle, and calculates the first and second propagation distances based on the highest two received power levels among the calculated received power levels.

6. The radio communication apparatus according to claim 1, wherein
    the position measurement unit computes positional coordinates of the terminal apparatus based on the first or second terminal-reflection point distance, or the first or second propagation distance, and measures the positional coordinates of the terminal apparatus located within a predetermined range as the position of the terminal apparatus.

7. The radio communication apparatus according to claim 1, wherein
    the calculation unit calculates a third propagation distance of a third received wave, when the third received wave via a third path is received,
    the decision unit determines whether the third received wave is the reflected wave or the direct wave based on the third propagation distance, outputs a third terminal-reflection point distance indicating a distance between the terminal apparatus and the first or second reflection point which is the closest to the terminal apparatus on the third path, on determining the third received wave as the reflected wave, and outputs the third propagation distance on determining the third received wave as the direct wave, and the position measurement unit measures the position of the terminal apparatus based on the first or second terminal-reflection point distance, on the first or second propagation distance, or on the third terminal-reflection point distance or the third propagation distance.

8. The radio communication apparatus according to claim 7, further comprising:
an array antenna which receives the radio signal by performing scanning at a predetermined scanning angle, wherein
the calculation unit calculates received power level for each scanning angle, and calculates the first to third propagation distances based on the highest three received power levels among the calculated received power levels.

9. The radio communication apparatus according to claim 7, wherein
the position measurement unit computes positional coordinates of the terminal apparatus based on the first or second terminal-reflection point distance, on the first or second propagation distance, or on the third terminal-reflection point distance or the third propagation distance.

10. The radio communication apparatus according to claim 1, wherein
the radio communication apparatus is a radio base station apparatus or an access point.

11. A position measurement method for performing radio communication with a terminal apparatus, in a radio communication apparatus including a calculation unit, decision unit, and position measurement unit, the position measurement method comprising:
calculating first and second propagation distances indicating path lengths of a first and second paths respectively, when radio signals transmitted from the terminal apparatus at least via first and second paths are received as first and second received waves respectively, by the calculation unit;
determining whether the first and second received waves are reflected waves reflected at first and second reflection points or direct waves without via the first and second reflection point, respectively, based on the first and second propagation distances, and outputting a first or second terminal-reflection point distance indicating a distance between the terminal apparatus and the first or second reflection point which is the closest to the terminal apparatus on the first or second path respectively, on determining the first or second received wave as the reflected wave, or outputting the first or the second propagation distance on determining the first or second received wave as the direct wave, by the decision unit; and
measuring the position of the terminal apparatus based on the first or second terminal-reflection point distance, or the first or second propagation distance, by the position measurement unit.

12. A radio communication system, comprising:
a terminal apparatus; and
a radio communication apparatus, wherein
the terminal apparatus and radio communication apparatus performs radio communication each other,
the terminal apparatus includes:
a transmission unit which transmits radio signal to the radio communication apparatus, and
the radio communication apparatus includes:
a calculation unit which calculates first and second propagation distances indicating path lengths of the first and second paths respectively, when radio signals transmitted from the terminal apparatus at least via first and second paths are received as first and second received waves respectively;
a decision unit which determines whether the first and second received waves are reflected waves reflected at first and second reflection points respectively, or direct waves without via the first and second reflection points, respectively, based on the first and second propagation distances, and outputs a first or second terminal-reflection point distance indicating a distance between the terminal apparatus and the first or second reflection point which is the closest to the terminal apparatus on the first or second path respectively, on determining the first or second received wave as the reflected wave, or outputs the first or second propagation distance on determining the first or second received wave as the direct wave; and
a position measurement unit which measures the position of the terminal apparatus based on the first or second terminal-reflection point distance, or on the first or second propagation distance, output from the decision unit.

* * * * *